(12) United States Patent
Takatori

(10) Patent No.: US 7,728,401 B2
(45) Date of Patent: Jun. 1, 2010

(54) THIN-FILM SEMICONDUCTOR DEVICE, CIRCUITRY THEREOF, AND APPARATUS USING THEM

(75) Inventor: Kenichi Takatori, Tokyo (JP)

(73) Assignee: NEC Corporation, Tokyo (JP)

( * ) Notice: Subject to any disclaimer, the term of this patent is extended or adjusted under 35 U.S.C. 154(b) by 1307 days.

(21) Appl. No.: 11/217,435

(22) Filed: Sep. 2, 2005

(65) Prior Publication Data
US 2006/0061406 A1   Mar. 23, 2006

(30) Foreign Application Priority Data
Sep. 6, 2004   (JP)   ............................. 2004-257897

(51) Int. Cl.
*H01L 31/058* (2006.01)

(52) U.S. Cl. ................ 257/467; 257/930; 257/E27.008

(58) Field of Classification Search ................. 257/467, 257/930, E27.008
See application file for complete search history.

(56) References Cited

U.S. PATENT DOCUMENTS

| 5,434,443 | A  | * | 7/1995  | Kelly et al.  | ................. | 257/467  |
| 6,809,320 | B2 | * | 10/2004 | Iida et al.   | ................. | 250/338.4 |
| 7,307,328 | B2 | * | 12/2007 | Meyer et al.  | ................ | 257/467  |
| 2003/0057372 | A1 | * | 3/2003 | Iida et al. | ................. | 250/338.4 |

* cited by examiner

*Primary Examiner*—Allan R. Wilson
(74) *Attorney, Agent, or Firm*—Young & Thompson

(57) ABSTRACT

A thin-film semiconductor device comprises a temperature sensor formed of a thin-film semiconductor and sensing a temperature as current, and a current-voltage converter formed of a thin-film semiconductor and having temperature dependence in which its current-voltage characteristic is different from that of the temperature sensor. A temperature sensed by the temperature sensor is converted to a voltage by the current-voltage converter.

12 Claims, 30 Drawing Sheets

Fig. 2A
PRIOR ART
Fig. 2B
PRIOR ART
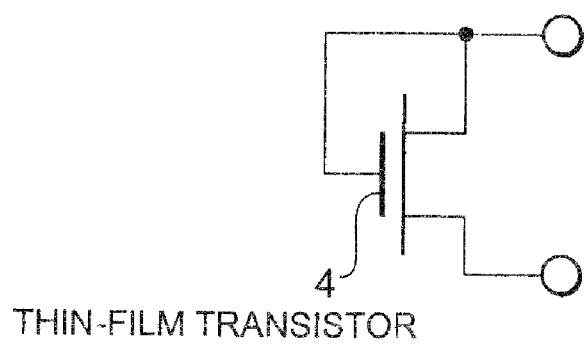
THIN-FILM TRANSISTOR
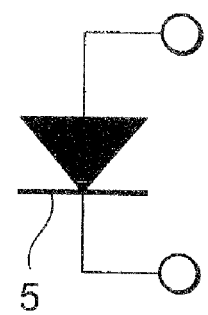
THIN-FILM DIODE

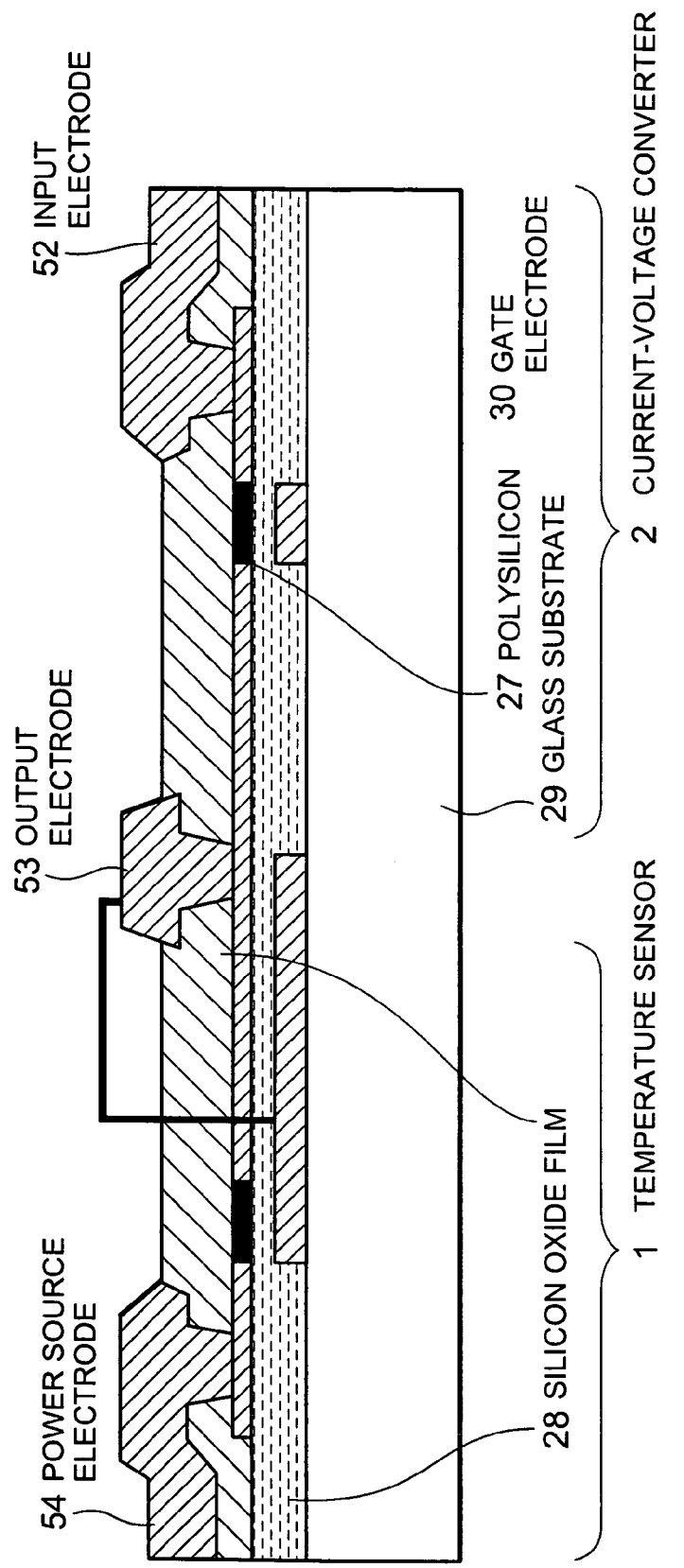

37 OVERDRIVE CIRCUITRY

THIN-FILM SEMICONDUCTOR DEVICE, CIRCUITRY THEREOF, AND APPARATUS USING THEM

BACKGROUND OF THE INVENTION

1. Field of the Invention

The present invention relates to a thin-film semiconductor device, driving circuitry thereof, and an apparatus incorporating the same and using temperature information when operating them.

2. Description of the Related Art

Temperature sensors have been provided on the outside of display devices to permit temperature-dependent correction of the driving waveform for a liquid crystal display. Thermistors, platinum resistance thermometers, thermocouples, temperature sensors with a pn junction diode using bandgap, SAW (surface acoustic wave) temperature sensors, thermosensitive magnetic substances, and radiation thermometers using an infrared ray are mainly used. Temperature sensors with a pn junction diode, which is inexpensive and has a high linearity to temperature, are being widely used. An attempt to substitute light measurement of transmittance or reflectance for the temperature sensor is being made. A photodiode and a photoconductive cell are used for such light measurement.

The prior art temperature sensors have some problems. When a temperature sensor is on the outside of a display device, the indicated temperature of the liquid crystal part is really only an estimated value, since the temperature of the liquid crystal part held between the support substrates is not directly measured. This will be described in detail using FIG. 1. FIG. 1 shows a construction in which two temperature sensors 83 are provided on the outside of a liquid crystal display manufactured by holding a liquid crystal 908 between glass substrates 10 and 29. In the construction, the lower left side of the glass substrate 29 is heated at 100° C., the glass substrate 10 side is at 20° C. and the back surface of the upper right side of the glass substrate 29 is at 35° C. Reflecting the temperature distribution, a temperature distribution of 25 to 65° C. occurs in the liquid crystal 908. On the other hand, the outputs of the temperature sensors are at 20° C. and 35° C. The temperature of the liquid crystal part cannot be correctly identified. The problem is significant especially in a sidelight construction in which the light source of a backlight is arranged at one side. A temperature distribution is different in accordance with a portion of the apparatus in other constructions. Externalizing the temperature sensor from the display makes it difficult to correctly measure a temperature when the liquid crystal is operated.

Including a temperature sensor in a display device has also been considered. In JP2000-338518 (reference 1), a temperature sensing device formed on the same substrate as a thin-film transistor to drive a liquid crystal is used. FIGS. 2A and 2B show equivalent circuits thereof. FIG. 2A shows an equivalent circuit constructed of a thin-film transistor 4 in which a gate electrode is short-circuited with a drain electrode or a source electrode. FIG. 2B shows an equivalent circuit constructed of a thin-film diode 5. In reference 1, a constant-current source located on the outside is connected to both ends of the temperature sensing device to sense a temperature. It is generally considered that using a current source formed on the same substrate as forms the temperature sensor can eliminate any noise problem. When an electric current is constant, a voltage applied to both ends of a diode depends on ambient temperature. This publication shows that a temperature can be sensed from the drain-source voltage. The temperature sensor using a thin-film diode manufactured in a liquid crystal display device measures a temperature which is very close to the temperature of the liquid crystal itself as compared with the temperature sensor outside the display. However, the current source is outside of the device, which is susceptible to noise from external apparatus. The temperature sensor needs to sense a very small electric current of several to several tens of nanoamperes. Thus, lowered accuracy due to externalization of the current source cannot be avoided. Moreover, thin-film semiconductors represented by amorphous silicon, polysilicon, and CG silicon cannot satisfactorily form the pn junction part as compared with a semiconductor using bulk silicon. The reference voltage is easily varied, and the sensed temperatures are varied.

It is generally considered that forming a current source on the same substrate as that of a temperature sensor can solve any noise problem. However, when the current source and the temperature sensor are formed on the same substrate, they have equal current change to temperature change so as to cancel the change in each other. Therefore, it is difficult to sense the temperature change.

Yannis Tsividis has reported in Yannis Tsividis, "Operation and Modeling of The MOS Transistor", Second edition, WCB/McGraw-Hill, pp. 183-190 that the gate voltage-drain current characteristic of transistors made of bulk silicon exhibits different temperature dependence by a gate voltage. As shown in FIG. 3, as an example, the temperature dependence of a drain current of the transistor made of bulk silicon is hardly seen near a gate voltage of 0.9 V, about twice a threshold value of 0.5 V. In a region lower than the gate voltage, the drain current is higher as the temperature is increased. In a region higher than the gate voltage, the drain current is higher as the temperature is decreased. In bulk silicon, a transistor as a temperature sensor and a transistor as a constant-current source are manufactured on the same substrate. The former is driven in a gate voltage region having temperature dependence. The latter is driven by a gate voltage region having small temperature dependence. In principle, temperature change can be sensed as a voltage.

On the other hand, a semiconductor layer used for a liquid crystal display is of amorphous silicon, polysilicon, or CG silicon, not of bulk silicon. The threshold values are distributed in a wide range and cannot be uniquely determined. Unlike transistors made of bulk silicon, it is difficult to set a gate voltage value based on a threshold value. Temperature monitoring with high accuracy is hard.

In thin-film semiconductor devices, with any of the methods of externalizing a temperature sensor, of locating a temperature sensor inside and having a current-voltage converter outside, or of having both a temperature sensor and a constant-current source inside, it is still difficult to measure the temperature of a liquid crystal with sufficient accuracy for controlling the liquid crystal.

SUMMARY OF THE INVENTION

An object of the present invention is to provide a thin-film semiconductor device which can take out a temperature as a voltage.

Another object of the present invention is to provide a method of driving a thin-film semiconductor device.

A further object of the present invention is to provide an apparatus which incorporates a thin-film semiconductor device which can sense a temperature as a voltage, to perform control of the operation of the apparatus corresponding to temperature change. For instance, it is to provide a liquid crystal display which can perform satisfactory image reproduction over a wide temperature range by changing the driving voltage and the light source driving method of the liquid crystal display in accordance with temperature.

A thin-film semiconductor device according to the present invention has a temperature sensor made of a thin-film semiconductor and sensing a temperature as current, and a current-voltage converter made of a thin-film semiconductor and having temperature dependence in which its current-voltage characteristic is different from that of the temperature sensor, wherein a temperature sensed by the temperature sensor is converted to a voltage by the current-voltage converter.

The thus-constructed thin-film semiconductor device according to the present invention can exhibit the function of temperature monitoring by converting a temperature-dependent current in the temperature sensor to a voltage by the current-voltage converter. According to the present invention, the temperature sensor and the current-voltage converter have different temperature dependence. Despite that both the temperature sensor and the current-voltage converter are made of the same thin-film semiconductor, this configuration can achieve a temperature-dependent voltage value with sufficient accuracy. The present inventors have found for the first time that in the thin-film semiconductor device, gate voltage regions in which the gate voltage-drain current characteristic is not dependent on temperature exist not only near the threshold value but also in a saturation region in which the drain current is saturated, and have made the present invention.

BRIEF DESCRIPTION OF THE DRAWINGS

FIG. 2A shows prior art temperature sensors, in which FIG. 2A shows a diode connected thin-film transistor and FIG. 2B shows a thin-film diode;

FIG. 19 is a cross-sectional view of the thin-film semiconductor device using a bottom-gated TFT;

DETAILED DESCRIPTION OF PREFERRED EMBODIMENTS

In typical bulk silicon technology, a temperature-independent region is limited to near a voltage twice the threshold value. On the other hand, the threshold value of thin-film semiconductor transistors varies widely. When using a region near the threshold value as the operating voltage of the current-voltage converter, a slight change of the voltage can cause temperature dependence. The temperature-independent characteristics of the saturation region are not changed when the voltage is slightly changed. The voltage of the saturation region is used as the operating voltage of the current-voltage converter and the region having temperature dependence is used as the operating voltage of the temperature sensor. Current change caused in the temperature sensor can be sensed as a voltage by the current-voltage converter.

Specifically, in the thin-film semiconductor device according to embodiments of the present invention, the current-voltage converter is a thin-film transistor having a thin-film semiconductor layer, a gate electrode applying a gate voltage to the thin-film semiconductor layer, and a drain electrode and a source electrode conducting an electric current to the thin-film semiconductor layer. To sense temperature change as an electric current, the gate voltage is set to a saturation region in which a drain current is saturated. Preferably, the gate voltage is larger than three times the threshold voltage of the thin-film transistor. As the temperature sensor, a diode connected thin-film transistor or a pn junction diode can be used.

According to embodiments of the present invention, the thin-film semiconductor device has on a substrate having a thin-film transistor array to drive pixels, a temperature sensor and a current-voltage converter connected to the temperature sensor and having temperature dependence different from that of the temperature sensor. It is possible to obtain a thin-film semiconductor device capable of sensing an output current changed depending on a temperature sensed by the temperature sensor as a voltage with high accuracy without canceling by the temperature characteristic of the current-voltage converter. Using this can obtain a liquid crystal display which can perform satisfactory image reproduction over a wide temperature range.

First Embodiment

1 Basic Configuration

Figure 1:
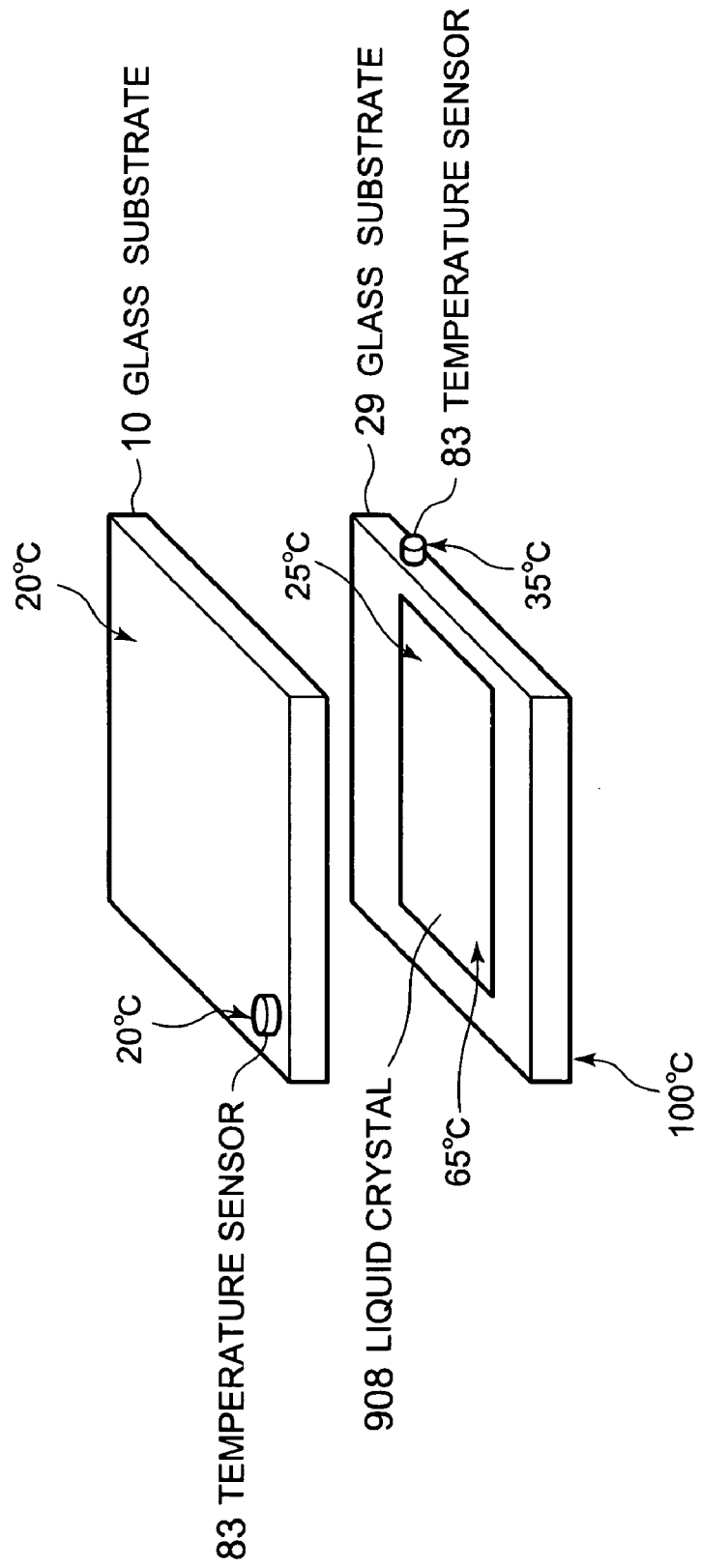
FIG. 1 is a diagram showing the problems of prior art temperature measurement in a liquid crystal display provided with temperature sensors outside the display.
Figure 3:
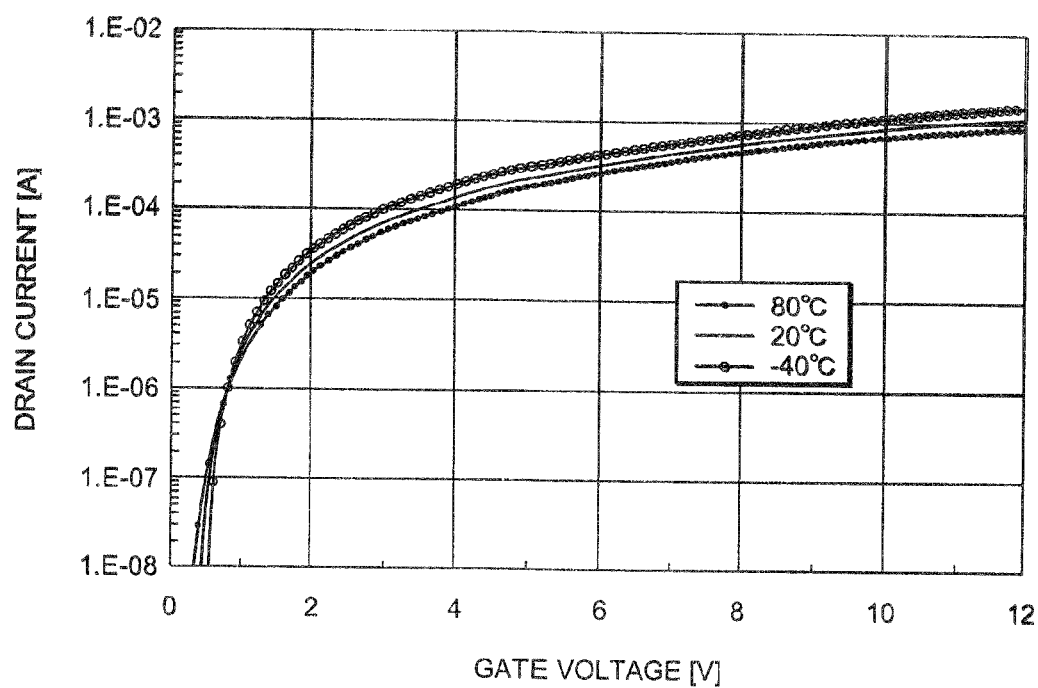
FIG. 3 is a diagram showing temperature dependence of drain voltage in changing gate voltage in the transistor manufactured by bulk silicon technology.
Figure 4:
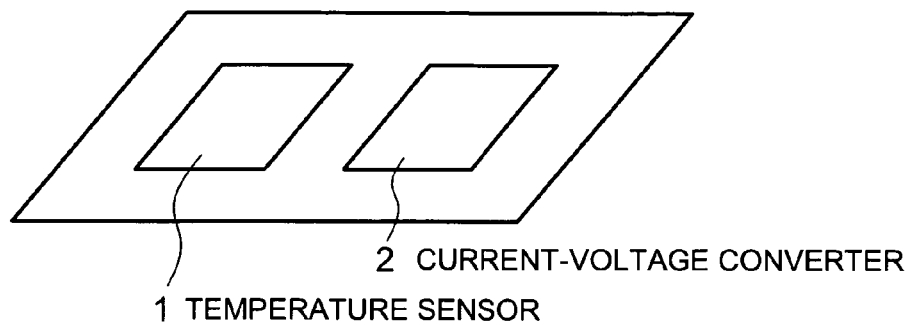
FIG. 4 is a diagram showing a thin-film semiconductor device of First Embodiment of the present invention.

As shown in FIG. 4, this embodiment of the present invention has a fundamental feature of having a temperature sensor 1 and a current-voltage converter 2 on the same substrate. Current change due to temperature change of the substrate sensed by the temperature sensor 1 is converted to a voltage by the current-voltage converter 2. The temperature change of the substrate can be observed as voltage change.

Figure 5A:
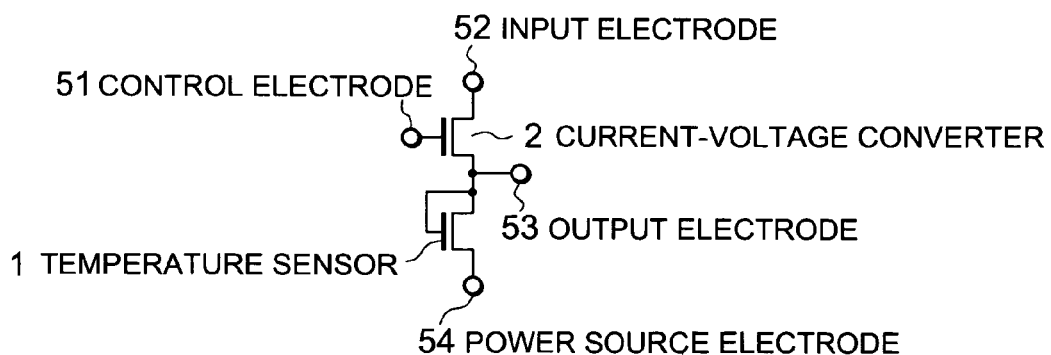
FIGS. 5A, 5B and 5C are diagrams showing examples of a circuit of a thin-film semiconductor device of First Embodiment of the present invention.

FIG. 5A is a schematic diagram showing this. The temperature sensor 1 and the current-voltage converter 2 are each made of a thin-film transistor (TFT) and are formed on the pixel driving TFT array substrate. The gate electrode of the temperature sensor 1 is short-circuited with the source electrode and is connected to the drain electrode of the current-voltage converter 2. A constant negative dc voltage is applied to the power source electrode 54 of the temperature sensor 1. A constant input voltage is applied to the input electrode 52 of the current-voltage converter 2. Then an electric current dependent on substrate temperature flows in the temperature sensor 1. The electric current can be monitored at an output electrode 53 as a voltage determined by a control voltage in the control electrode 51.

Figure 5B:
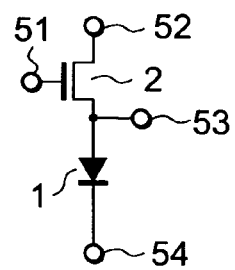
Figure 5C:
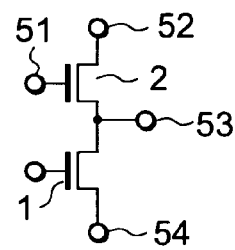

As shown in FIG. 5B, using the pn junction diode of a thin-film semiconductor as the temperature sensor can obtain the same function. As shown in FIG. 5C, without short-circuiting the gate electrode and the source electrode of the temperature sensor 1, a voltage is independently applied to the gate electrode of the temperature sensor 1 and the gate electrode of the current-voltage converter 2 to realize the present invention. By way of example, the size of the thin-film transistor has a gate length of 4 μm and a gate width of 4 μm. Polysilicon is used as the semiconductor layer.

Figure 6:
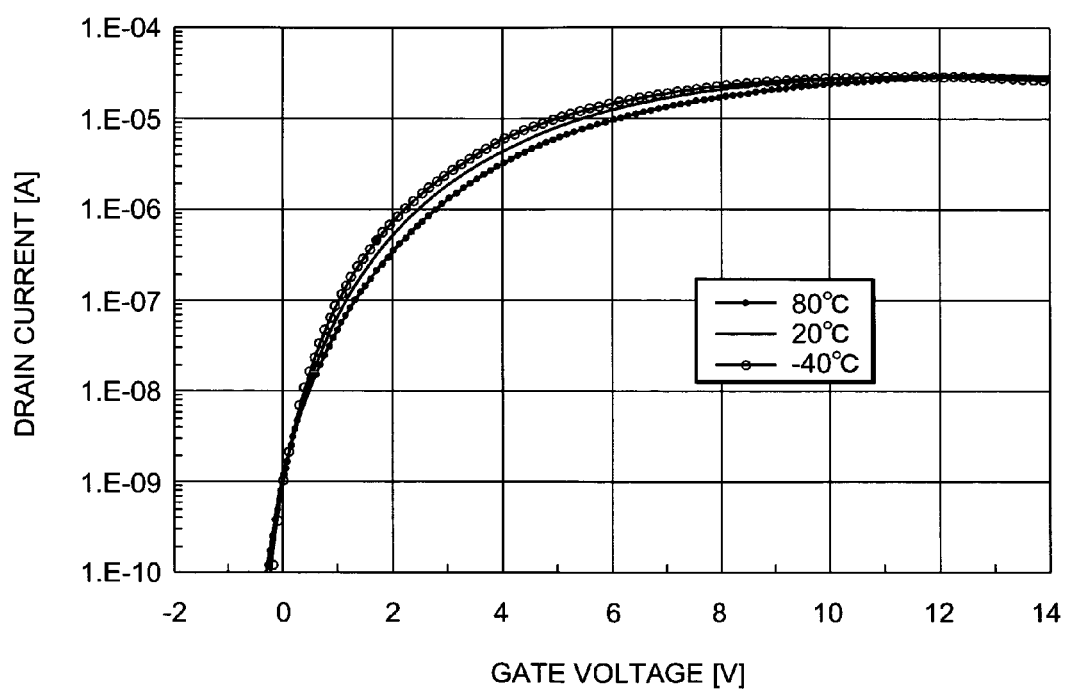
FIG. 6 is a diagram showing temperature dependence of drain voltage in changing gate voltage in a thin-film transistor made by the polysilicon technology of a thin-film semiconductor device of First Embodiment of the present invention.

FIG. 6 shows an example of the gate voltage dependence of the drain current of such thin-film transistor. The horizontal axis indicates gate voltage and the vertical axis indicates drain current in logarithmic plot. The thin-film transistor has a threshold voltage of 0.9 V. When changing the temperature to −40° C., 20° C., and 80° C., a region in which the drain current is independent of temperature exists at gate voltages of 0.3 V and 12 V. The drain current decreases with increasing temperature in a region of 0.3 to 12 V. The drain current increases with increasing temperature in a region above 12 V and a region below 0.3 V.

2 Characteristic when Using a Control Voltage Giving a Drain Current Independent of Temperature A region independent of temperature is used for a gate voltage driving the thin-film transistor of the current-voltage converter 2 (called a control voltage). 0.3 V is near the threshold value so that the characteristic cannot be stable. Thus, the control voltage is set to near 12 V of the saturation region.

Figure 7:
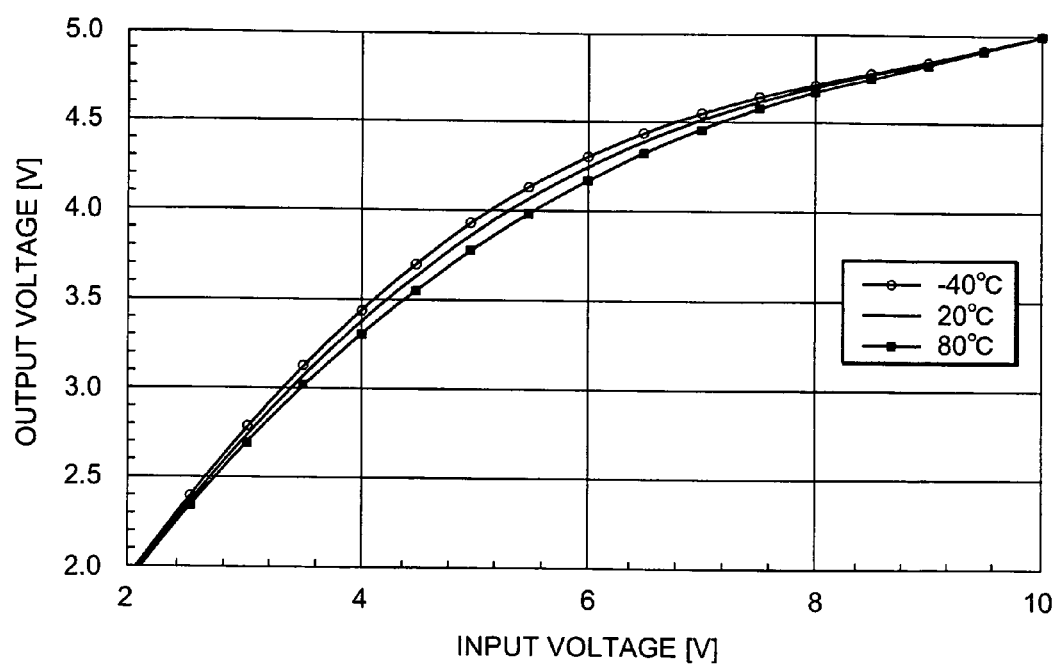
FIG. 7 is a diagram showing temperature dependence of the relation between input voltage and output voltage of the temperature sensor made by the polysilicon technology according to First Embodiment of the present invention.
Figure 8:
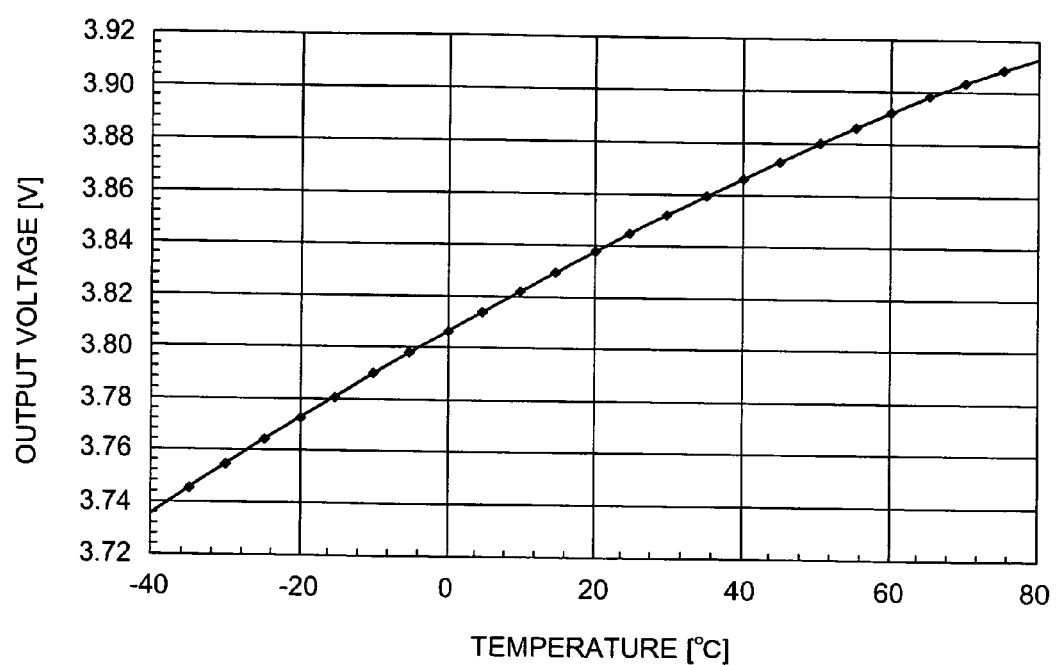
FIG. 8 is a diagram showing the relation between temperature and output voltage of the temperature sensor at an input voltage of 5 V according to First Embodiment of the present invention.

FIG. 7 shows an input/output voltage characteristic when the control voltage is 10 V in FIG. 5A. Temperature dependence can be obtained in the input voltage range of 2 to 8V. The temperature sensitivity near 5 V is highest. FIG. 8 shows change in output voltage to temperature when fixing an input voltage to 5 V. The output voltage exhibits a satisfactory linearity to temperature. The voltage rise value per kelvin is 1.5 mV. The threshold value of the TFT made by the polysilicon technology is varied greatly. This embodiment uses the gate voltage sufficiently larger than the threshold value and is hardly susceptible to variation in the threshold value. In the configuration of FIG. 5B, almost the same result can be obtained. In the configuration of FIG. 5C, the control voltage is 10 V and the gate voltage of the temperature sensor 1 is 3 V where the temperature dependence is large in FIG. 6. In this case, almost the same result can be obtained.

Figure 9:
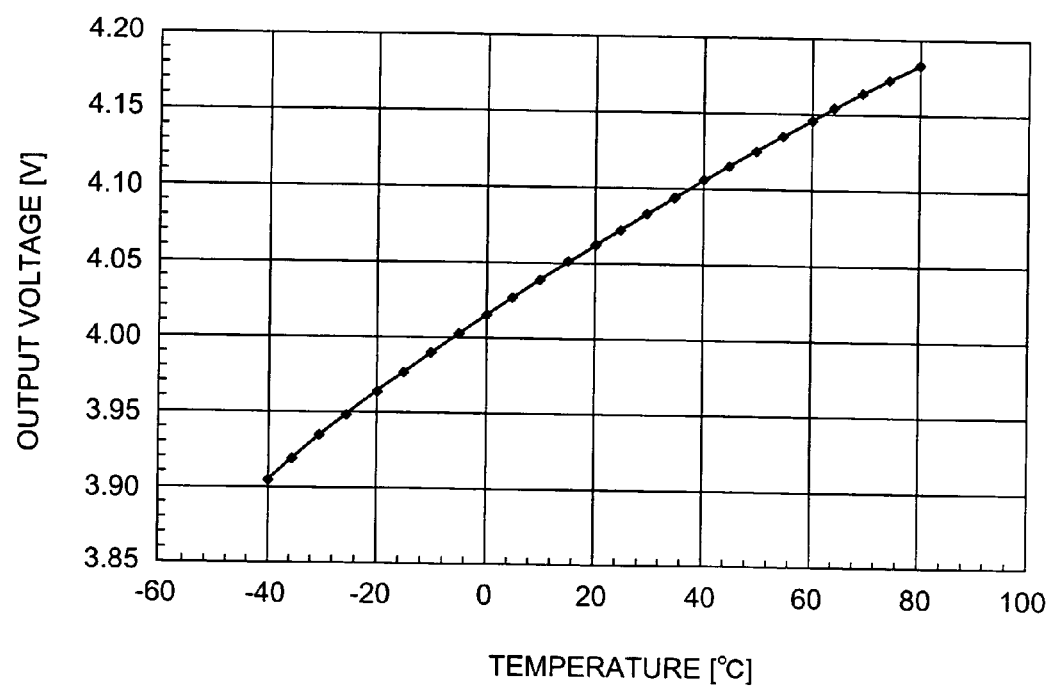
FIG. 9 is a diagram showing the relation (a control voltage of 15 V) between temperature and output voltage of the thin-film semiconductor device using a region six times (or more) larger than the threshold value as the control voltage of the current-voltage converter 2.

3 Characteristic when Using a Control Voltage Giving a Drain Current Whose Temperature Dependence is Opposite to that of the Temperature Sensor As the control voltage of the current-voltage converter 2, a region six or more times the threshold value where the temperature dependence is opposite to that of the temperature sensor 1 is used for temperature sensing. By way of example, FIG. 9 shows the relation between temperature and output voltage when setting the control voltage to 15 V, the gate voltage of the temperature sensor 1 to near 3 V, and the input voltage to 5 V in the configuration of FIG. 5C. The temperature dependence of the current-voltage converter 2 is opposite to the temperature dependence of the temperature sensor 1, as shown in FIG. 6. Temperature sensing having temperature dependence opposite to that of the temperature sensor 1 is thereby enabled. In this case, the output voltage also exhibits a satisfactory linearity to temperature. The voltage rise value per kelvin is 3.0 mV. Sensitivity can be achieved that is about twice that obtained when using the control voltage giving the temperature-independent drain current in the previous section.

4 Optimizing a Control Voltage

Figure 10:
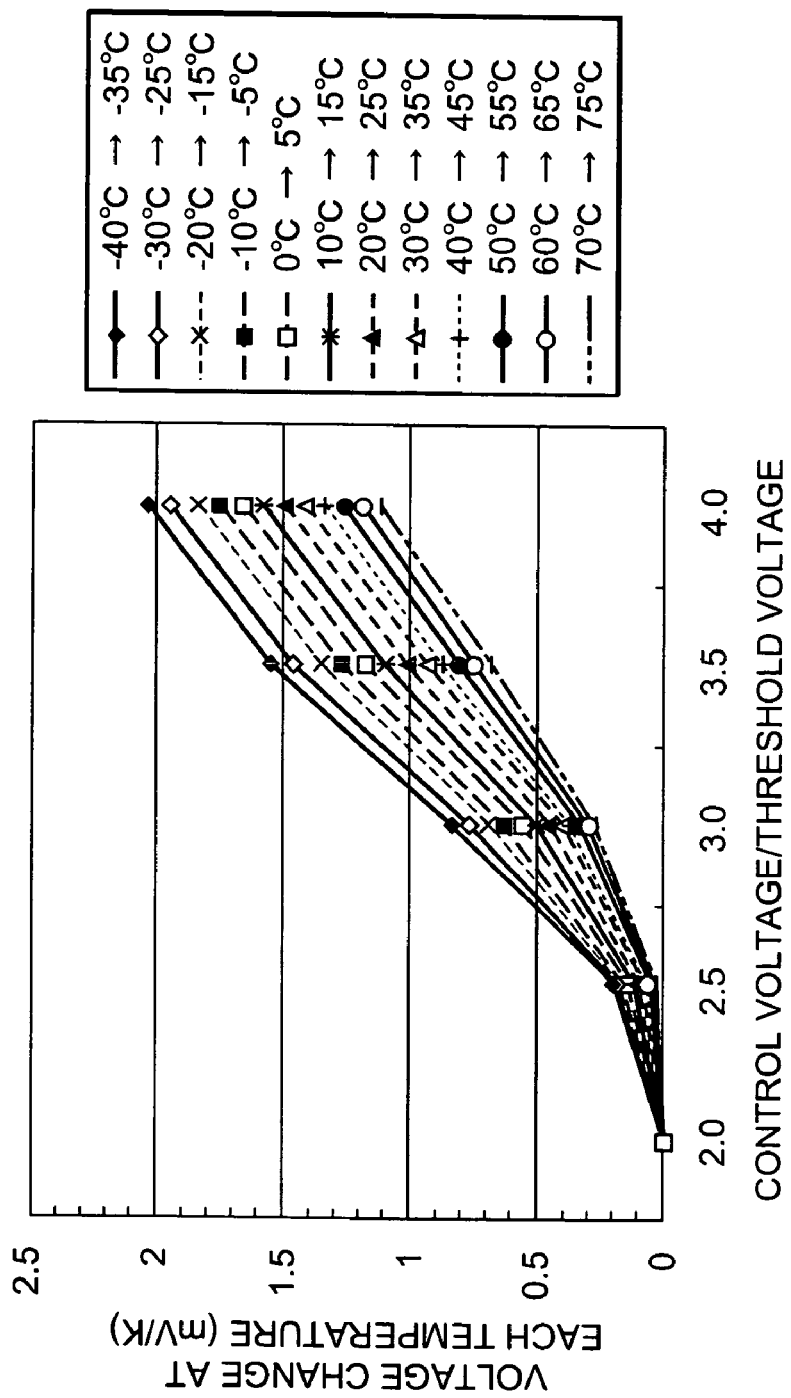
FIG. 10 is a diagram showing the relation between the ratio of control voltage to threshold voltage and the change of output voltage corresponding to temperature change by 5° C. at each temperature.

To determine an optimum control voltage as the temperature sensor, control voltage dependence of the temperature sensitivity is inspected. Change in output voltage to temperature change by 5° C. is measured by changing the ratio of control voltage to threshold voltage. FIG. 10 shows the result. The horizontal axis indicates the ratio of the control voltage to the threshold voltage. The vertical axis indicates change in output voltage when temperature is changed by 5° C. The condition in which the ratio of the control voltage to the threshold voltage is 2.0 is the condition of the later-described Comparative Example 1. When changing the temperature in this condition, there is hardly any voltage change. Voltage change occurs slightly at the ratio of 2.5; however, that value is too small for optimum use as the temperature sensor. At the ratio of 3.0, the average value of the voltage change is about 0.5 mV/K and can be practical as the temperature sensor. At the ratio of 3.5, the average value of the voltage change is about 1.1 mV/K. At the ratio of 4.0, the average value of the voltage change is about 1.5 mV/K. When the ratio of the control voltage to the threshold voltage is 3 or above, a preferred function as the temperature sensor can be obtained. Measurement enlarging the range changing the ratio of the control voltage to the threshold voltage is made for regression analysis processing. The relation between the ratio of voltages and the temperature sensitivity can be generalized in a wider range. In the measurement, the average ratio of output voltage change to temperature change is defined as a gain in the measured temperature range. The gain corresponds to a regression coefficient when temperature is set as the horizontal axis and output voltage is set as the vertical axis so that the regression analysis is applied to the obtained characteristic by collinear approximation. A determination coefficient (called an R2 value) in the regression analysis exhibits a dispersion of measurement values around the regression line. The determination coefficient exhibits a linearity of the output voltage to the temperature. The value is in the range of 0 to 1. As it is close to 1, the linearity is more preferred.

Figure 11:
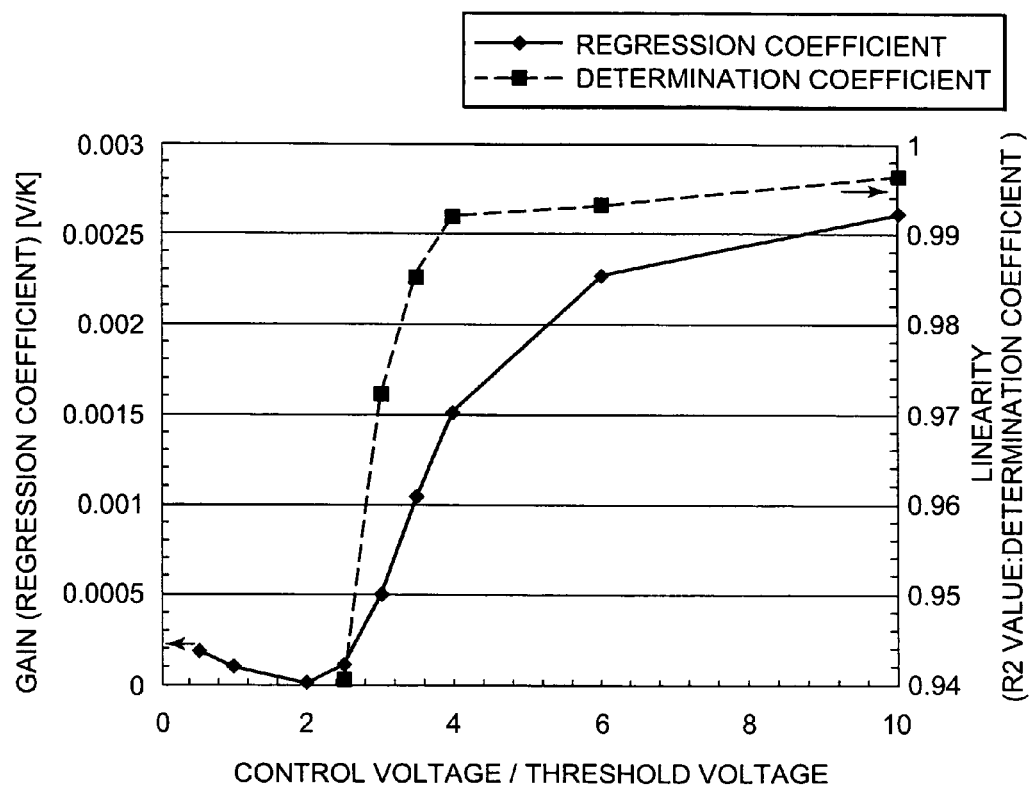
FIG. 11 is a diagram showing the relation among the ratio of control voltage to threshold voltage, gain, and linearity.

FIG. 11 shows the relation between the gain and linearity when changing the ratio of the control voltage to the threshold voltage to 0.5, 1.0, 2.0, 2.5, 3.0, 3.5, 4.0, 6.0, and 10.0. When the ratio of the control voltage to the threshold voltage is 2.0, the output voltage value is almost constant. In this case, the regression analysis in which temperature is indicated by the horizontal axis cannot determine a correct determination coefficient. Thus, the linearity at the ratio of 2.0 is not plotted. As is understood from the drawing, a region in which the ratio of the control voltage to the threshold voltage is smaller than 1.0 obtains a characteristic having a very high linearity. As in the ratio of 0.5, a condition exists in which a certain amount of gain is obtained. The region can be used as the temperature sensor. As described above, the region is significantly susceptible to the threshold voltage. When using it by the polysilicon technology, a measured error becomes large. At the ratio of 2.5, the gain is low and the linearity is not so satisfactory. When the ratio of the control voltage to the threshold voltage is 3.0 or above, the gain is 0.5 mV or above per kelvin and also the linearity above 95% is obtained. At the ratio of 3.0 or above, the gain and linearity both exhibit satisfactory values. The region can be used as the temperature sensor.

The control voltage need not be applied continuously but may instead be applied intermittently in the cycle where temperature information is necessary. By this intermittent access, lower power consumption can be obtained. In the thin-film semiconductor device according to the present invention, when applying the control voltage, an electric current flows between the input electrode and the negative power source electrode. Temperature change of the electric current is measured to obtain temperature information. In place of the control voltage, a voltage in which the transistor of the current-voltage converter of FIG. 5A is brought to the off state is applied. Then, the electric current in the transistor of the current-voltage converter is almost zero. At the same time, the electric current in the temperature sensor doesn't flow so that the current consumed is almost zero. When temperature change of an object is about 1° C. per second, only one measurement per second may give sufficient temperature information. When measuring temperature in a 10-millisecond period once per second, intermittent application of the control voltage reduces the consumption current to $1/100$. Leakage current in the off state and current consumption caused by changing a voltage applied to the control electrode cause the actual current consumption to be about $1/25$.

5 Driving Control by the Thin-Film Semiconductor Device

Figure 12:
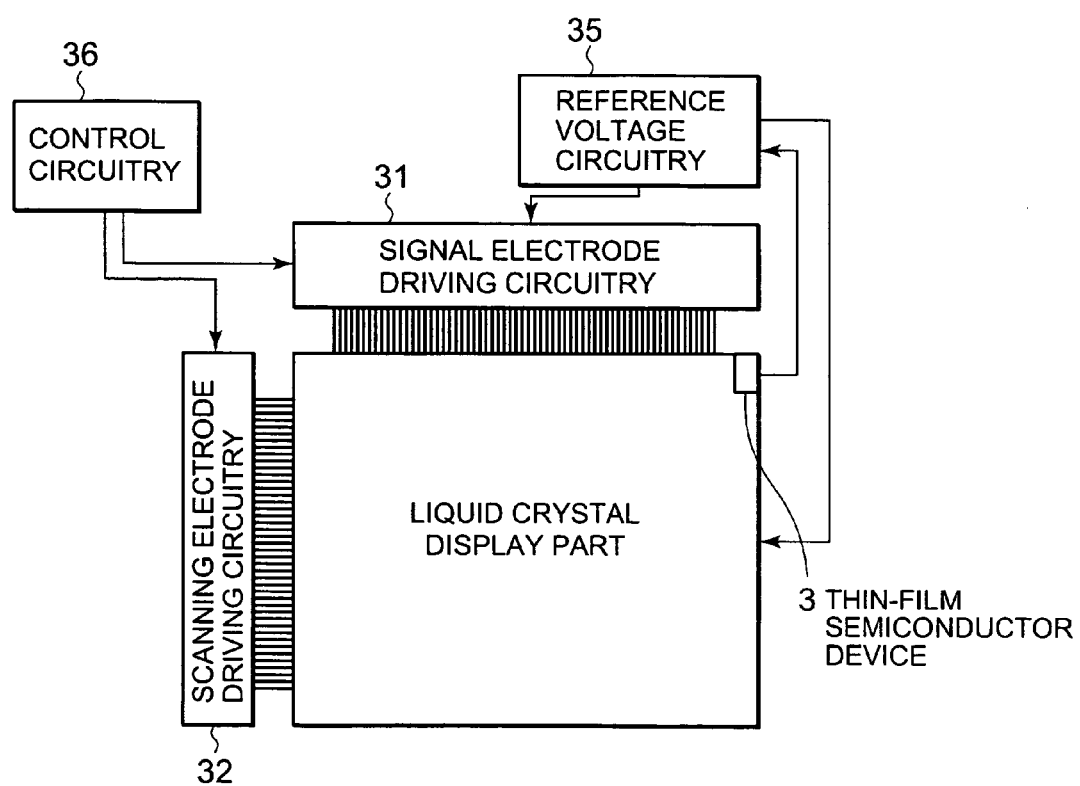
FIG. 12 is a functional block diagram showing feedback control of the driving circuitry reference voltage of a liquid crystal display by the thin-film semiconductor device.

FIG. 12 shows an example of a functional block feeding back temperature information obtained by the thin-film semiconductor device to the reference voltage of liquid crystal display driving circuitry. The liquid crystal display area is driven by signal electrode circuitry 31 and scanning electrode circuitry 32. The operation of these is controlled by control circuitry 36. The amplitude of signals produced by the signal electrode driving circuitry 31 is determined by a reference voltage produced by reference voltage circuitry 35. A thin-film semiconductor device 3 of the present invention is disposed on the liquid crystal display area. The signal amplitude of the reference voltage 35 is controlled by an output signal from the thin-film semiconductor device 3. The amplitude of a signal voltage actually applied to the liquid crystal can be adjusted in accordance with temperature to obtain image quality regardless of temperature. The reference voltage adjusted by the temperature information is applied from the reference voltage circuitry 35 to the liquid crystal display area and the signal electrode driving circuitry 31. The amplitude of a signal voltage actually applied to the liquid crystal can be adjusted in accordance with temperature.

Figure 13:
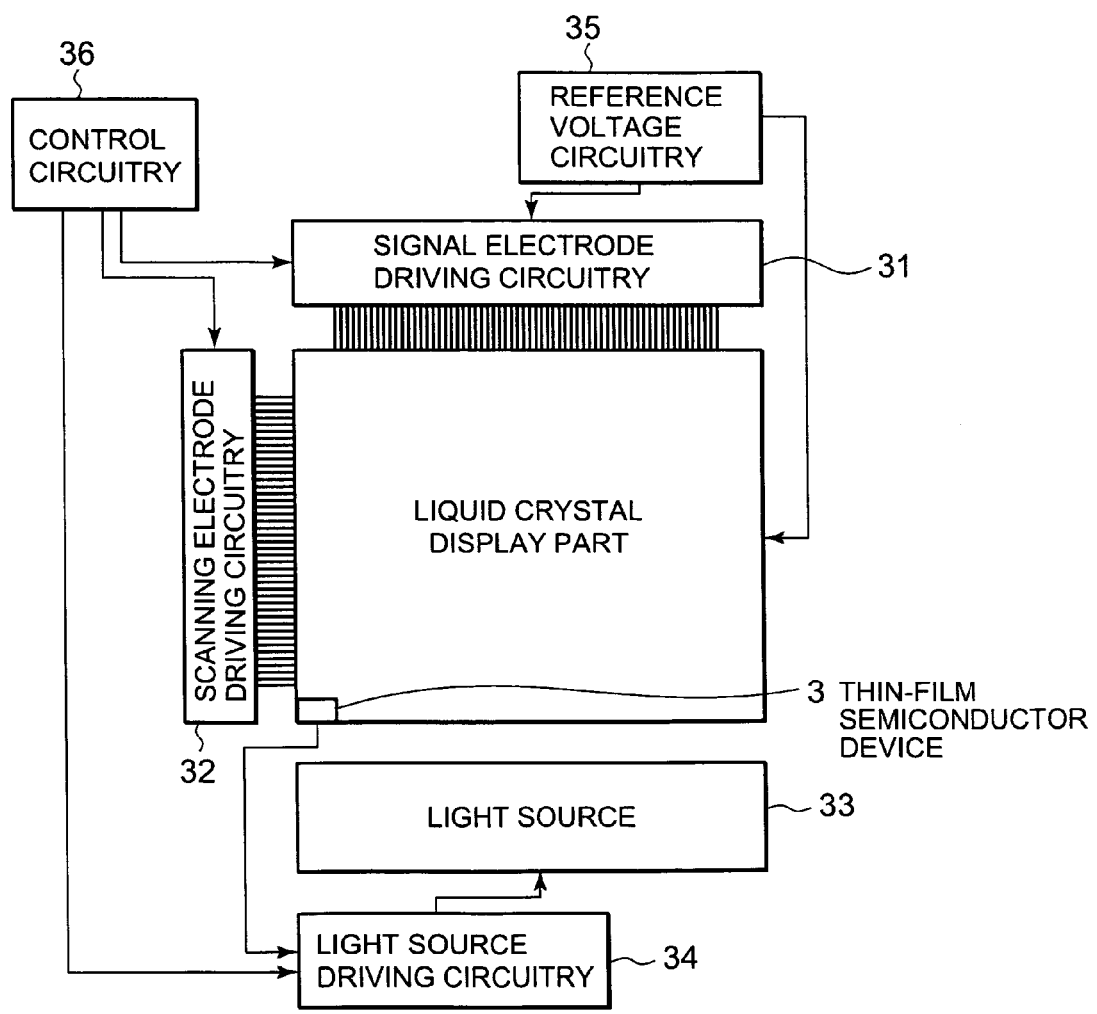
FIG. 13 is a functional block diagram showing control of the backlight of the liquid crystal display by the thin-film semiconductor device.

As shown in FIG. 13, the temperature information outputted from the thin-film semiconductor device 3 can be fed back to the backlight. To brighten the screen, in the liquid crystal display the display area is illuminated with light emitted from a light source 33. The brightness of the light source 33 is controlled by light source driving circuitry 34 driven by the control circuitry 36. The output voltage of the thin-film semiconductor device 3 disposed on the liquid crystal display area is fed back to the light source driving circuitry 34 to adjust the light source brightness in accordance with temperature change. When the temperature is lowered and the light efficiency of the liquid crystal display area is reduced, the configuration controls the brightness of the backlight to increase in order to reduce the influence of the lowered temperature on the image reproduction.

6 TFT Manufacturing Method

In this embodiment, a TFT manufacturing method by the polysilicon technology which is used most widely will be described. Here, the polysilicon technology refers to a technology forming a polysilicon thin film having a polycrystalline structure on an insulator film on a substrate.

(1) Basic Manufacturing Method

There are two TFT structures of the top-gated and the bottom-gated types. Application of the top-gated TFT will be described using FIG. 14. A silicon oxide film 28-1 is formed on a glass substrate 29, then an amorphous silicon film is formed. An excimer laser is used in annealing to modify the amorphous silicon to polysilicon 27. After patterning it, the silicon oxide film 28-2 of 10 nm is formed. A photoresist is patterned to be slightly larger than the gate shape (to form LDD regions 23 and 24 later). Phosphorous ions are doped to form a source region and a drain region. After growing the silicon oxide film 28-2 as a gate oxide film, the amorphous silicon and tungsten silicide (WSi) as a gate electrode are grown. Patterning those with a photoresist mask forms the gate electrode. With the patterned photoresist as a mask, phosphorous ions are doped only in necessary regions to form the LDD regions 23 and 24.

The silicon oxide film 28-3 is grown. Via holes are formed. Aluminum and titanium are formed by sputtering, then patterned to form a source electrode 26 and a drain electrode 25. The silicon nitride film 21 is formed on the entire surface, then a contact hole is formed. An ITO film is formed on the entire surface for patterning to form a transparent pixel electrode 22.

Figure 14:
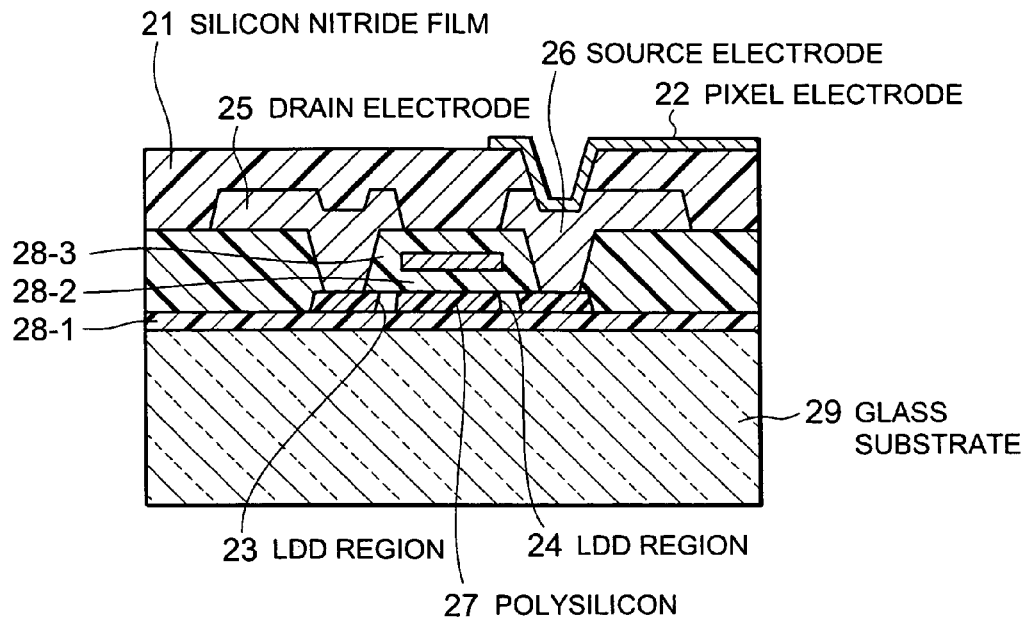
FIG. 14 is across-sectional view showing the cross-sectional structure of a planar type polysilicon TFT switch used in First Embodiment of the present invention.

The planar type TFT pixel switch as shown in FIG. 14 is manufactured to form a TFT array. The pixel array with the TFT switches and the scanning circuitry are formed on the glass substrate. Arraying can be made by the prior art manufacturing method. In FIG. 14, the TFT is formed by the polycrystallization of amorphous silicon. The TFT may be formed by a method of improving the grain size of polysilicon with laser irradiation after growing. Other than the excimer laser, continuous-wave (CW) laser may be used.

(2) Thin-Film Semiconductor Device Manufacturing Method

Figure 15:
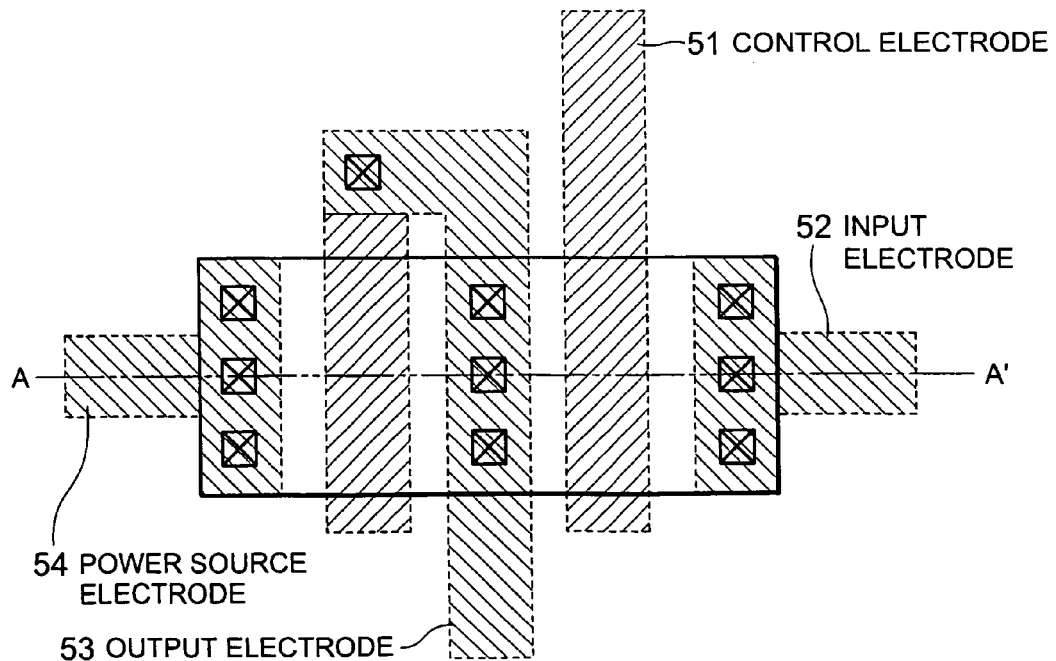
FIG. 15 is a diagram showing a mask pattern for forming the thin-film semiconductor device according to First Embodiment of the present invention performing connection of polysilicon and a gate electrode via a metal used in a drain and source electrode.
Figure 16:
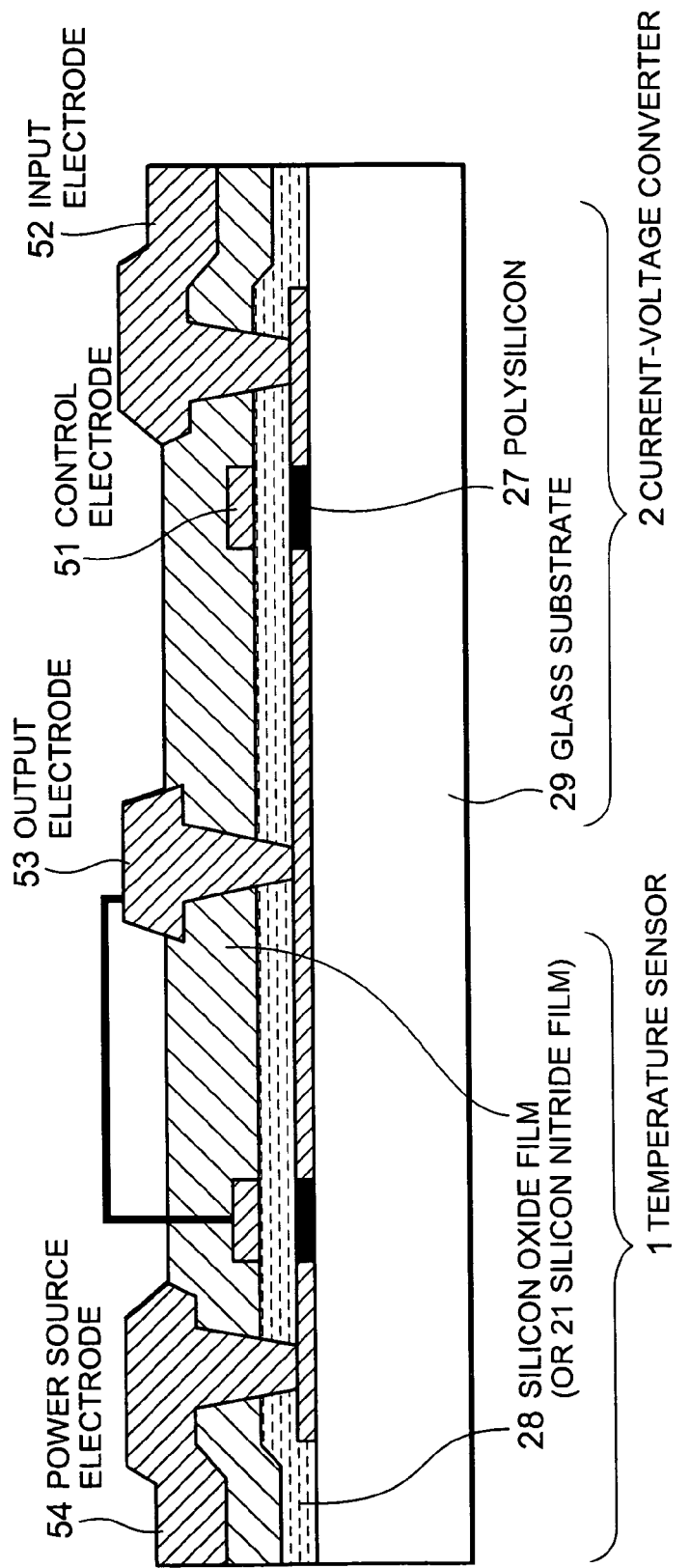
FIG. 16 is a cross-sectional view taken along line A-A' of the thin-film semiconductor device manufactured in FIG. 15.
Figure 17:
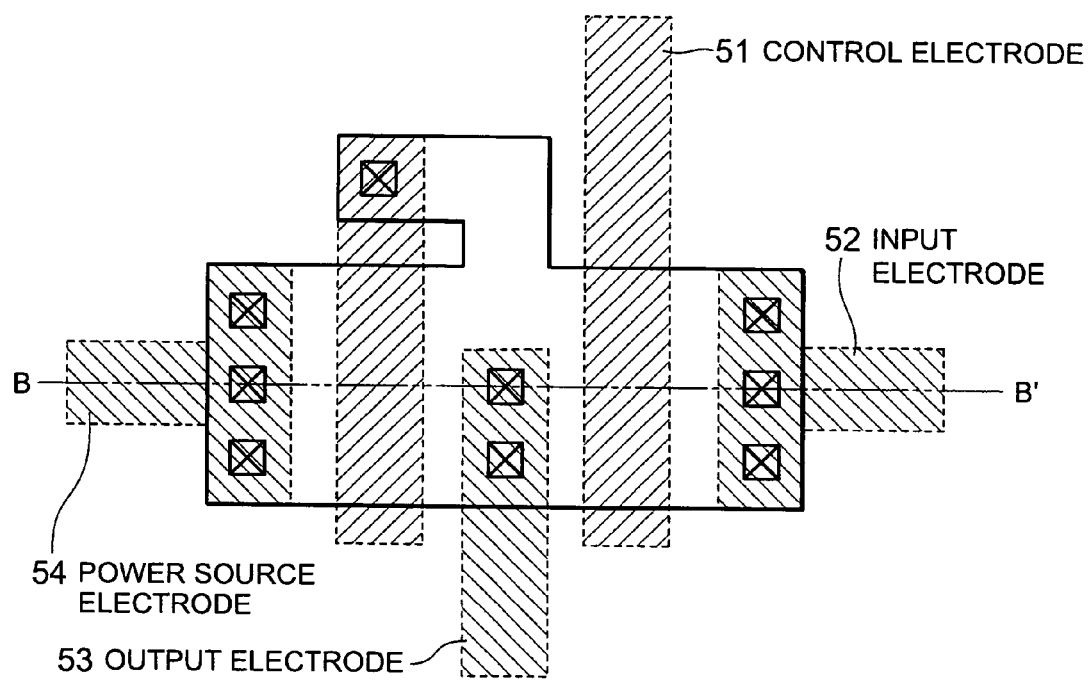
FIG. 17 is a diagram showing a mask pattern for forming the thin-film semiconductor device according to First Embodiment of the present invention directly performing connection of polysilicon and a gate electrode.
Figure 18:
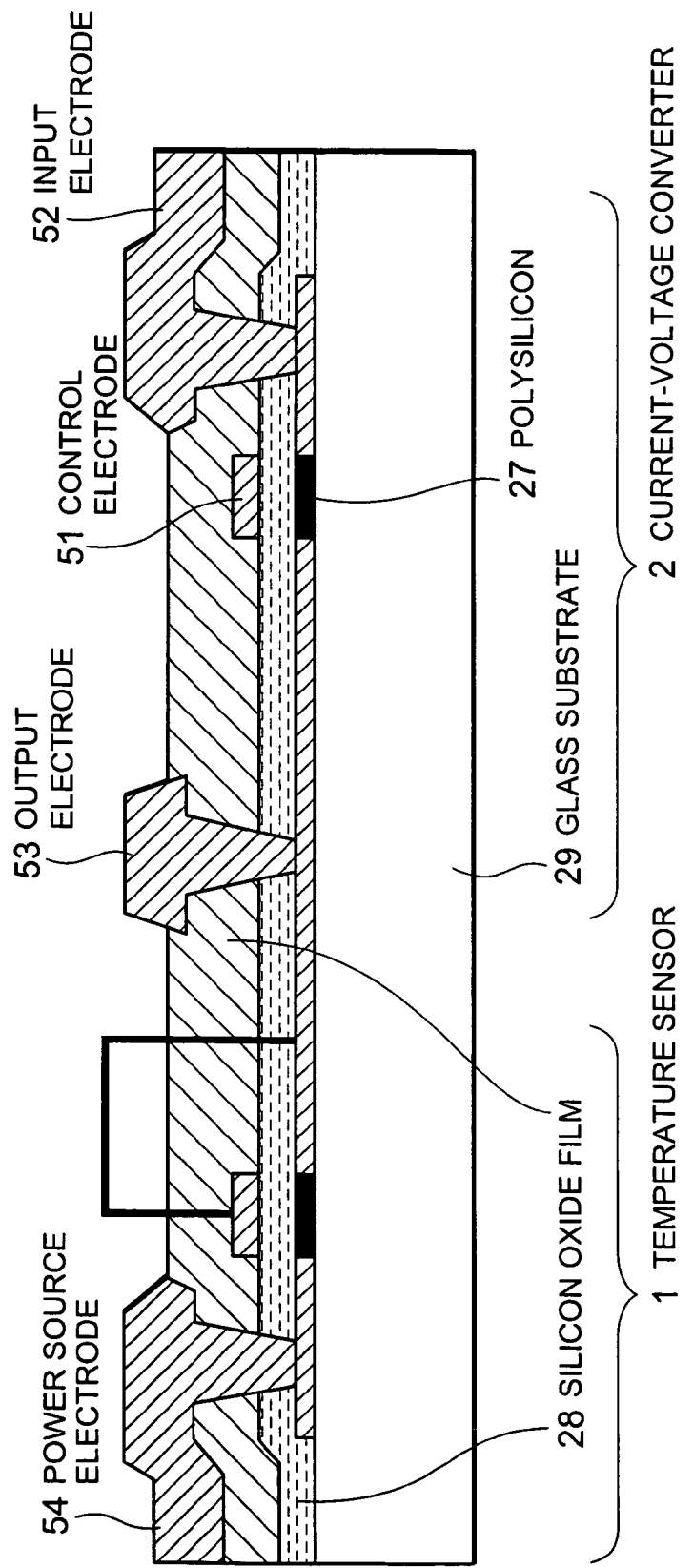
FIG. 18 is a cross-sectional view taken along line B-B' of the thin-film semiconductor device manufactured in FIG. 17.

The thin-film semiconductor device according to the present invention can be manufactured based on the processes described in (1). FIG. 15 shows an example of a mask layout diagram used here. FIG. 16 shows a cross-sectional view of the device manufactured using the mask along the line A-A' of FIG. 15. In this example, the gate electrode and the drain electrode of the temperature sensor and the source electrode of the current-voltage converter are connected via the metal of the output electrode 53 and are equivalent to a diode. FIG. 17 shows an example of another mask layout. FIG. 18 shows a cross-sectional view of the device manufactured using the mask along the line B-B'. In this example, the gate electrode and the drain electrode of the temperature sensor and the source electrode of the current-voltage converter are connected via a polysilicon film, not the metal material of the output electrode. In this structure, only contact between the gate electrode and the doped polysilicon film exists in the diode connection part.

The top-gated TFT in which the gate electrode is above the thin-film semiconductor layer is described above. The present invention can be realized by the bottom-gated TFT in which the gate electrode in below the thin-film semiconductor layer. A method for manufacturing the thin-film semiconductor device according to the present invention when using the bottom-gated TFT will be described.

Figure 20A:
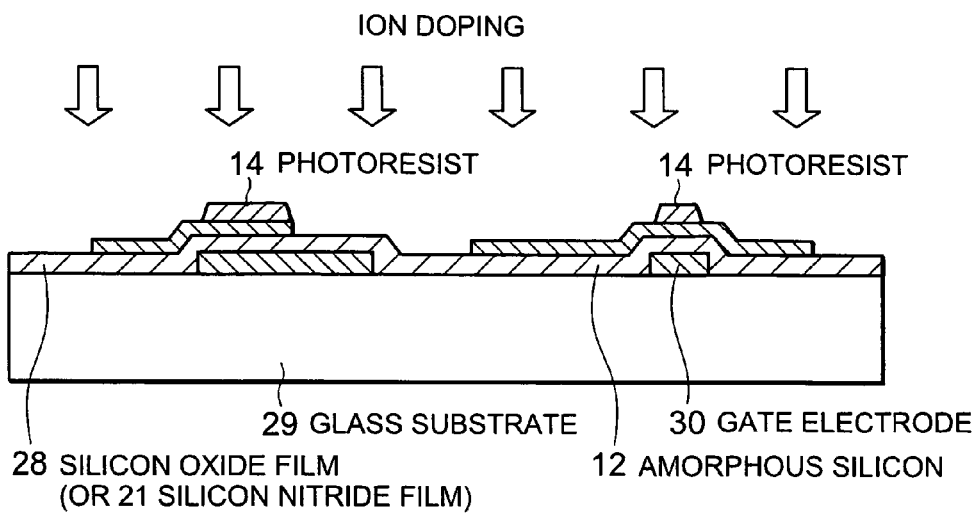
FIGS. 20A and 20B are diagrams showing a method of manufacturing a source and drain region in the thin-film semiconductor device using the bottom-gated TFT.
Figure 20B:
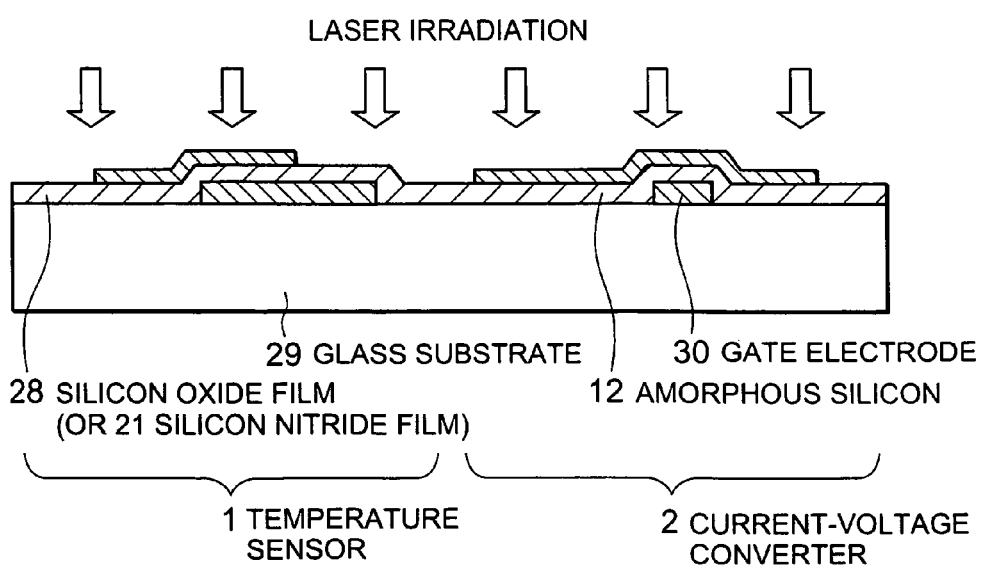

FIG. 19 is a cross-sectional view of the device of the embodiment according to the present invention of the bottom-gated TFT. It is the same as the layout of the thin-film semiconductor device in which the gate electrode and the drain electrode of the temperature sensor and the source electrode of the current-voltage converter are connected via the metal of the output electrode described in FIGS. 15 and 16 except that the gate electrode is the lowest layer. FIGS. 20A and 20B show a method for manufacturing source and drain regions in the manufacturing method of FIG. 19. Silicon oxide, not shown, is deposited on the glass substrate 29 and chromium (Cr) is formed thereon as a gate electrode 30. The silicon nitride film 21 or the silicon oxide film 28 is formed as a gate insulator film by the PE-CVD method and then amorphous silicon 12 is deposited. The pattern of a photoresist 14 is formed as a doping mask on the channel region of the amorphous silicon 12 to dope impurities (phosphorus or boron) into the source and drain region by the ion doping method (FIG. 20A). The photoresist 14 is removed, followed by thermal treatment at 400° C. for 90 minutes in vacuum to reduce the hydrogen concentration of the amorphous silicon film 12, whereupon the film 12 is irradiated with an excimer laser to crystallize the amorphous silicon film 12 (FIG. 20B). The impurities doped region is activated simultaneously with crystallization. After forming the source and drain electrodes, the silicon oxide film is deposited and hydrogenated for 90 minutes in a hydrogen plasma atmosphere at 300° C. to reduce dangling bond existing in the grain boundary of the poly-Si thin film.

According to First Embodiment of the present invention, the voltage applied as the control voltage is set to an appropriate range. Current change due to temperature change sensed by the temperature sensor 1 can be sensed as voltage change by the current-voltage converter 2. The control voltage is set to the region in which the drain current does not cause temperature dependence or the region whose temperature dependence is different from the temperature dependence of the temperature sensor. The current-voltage converter 2 and the temperature sensor 1 display independent temperature characteristics, and so a satisfactory temperature sensor can be achieved.

Second Embodiment

This embodiment is different from the first embodiment in that the TFT is formed by the partially depleted SOI technology, not the polysilicon technology.

The SOI technology refers to a technology forming a single crystal silicon thin film on an insulator film formed on a substrate. The SOI technology is classified as the partially depleted SOI technology and the fully depleted SOI technology. The difference between both is the degree of depletion in a silicon film and specifically is divided based on the thickness of the silicon film. The process when the thickness of the silicon film is twice or more the thickness of the thickest depletion layer is called partially depleted SOI technology. The greatest thickness of the depletion layer depends on the amount of impurities and Fermi potential level and is different for each of the device technologies. The silicon film thicknesses of the partially depleted and the fully depleted are different for each of the device technologies. Generally, the film thickness less than 50 nm is called the fully depleted and the film thickness of 100 to 200 nm (or above) is called the partially depleted. Here, they are defined in the same way.

As compared with the bulk silicon technology, the SOI technology includes the following features:

(1) allowing low voltage and fast operation because of a small junction capacitance;

(2) offering a high resistance to a radiation; and (3) densely integrating the circuits with less cross talk.

For the substrates for the SOI technology, an SIMOX substrate of oxygen ion implantation, a UNIBOND (Smart Cut) substrate by hydrogen ions, bonding and separation, and an ELTRAN substrate by bonding using a porous silicon substrate and water jet separation are currently manufactured.

In the partially depleted SOI, the process of manufacturing the device is the same as the typical bulk silicon process except for using a different silicon substrate. A bonded substrate is often used for the partially depleted SOI. The thickness of the oxide film of the bonded substrate is controlled with high accuracy. For the silicon portion on which polishing is mechanically performed and the film thickness is easily varied, however the film thickness of the partially depleted SOI is great so that the influence of the varied film thickness is less. For these reasons, a bonded substrate is often used.

The process when the thickness of the silicon film is less than the greatest thickness of the depletion layer is called the fully depleted SOI technology. This will be described in the third embodiment.

Figure 21:
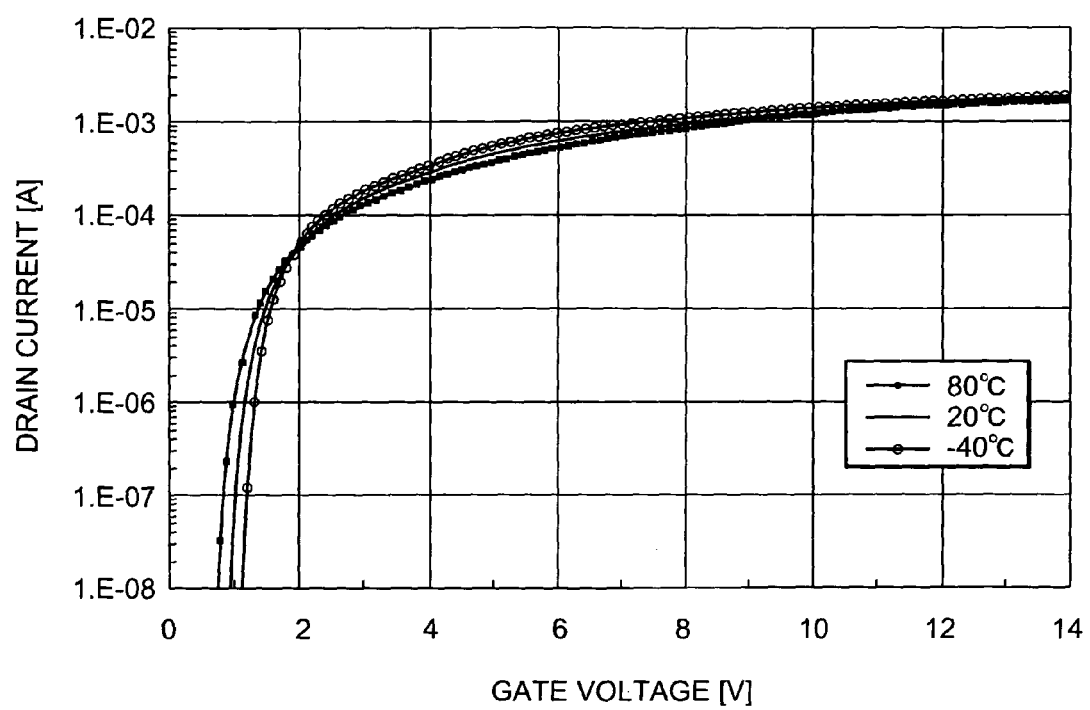
FIG. 21 is a diagram showing temperature dependence of drain voltage in changing gate voltage in a transistor manufactured by the partially depleted SOI technology of the thin-film semiconductor device.

FIG. 21 shows an example of the drain current-gate voltage dependence of the TFT manufactured by the partially depleted SOI technology. The mobility of the semiconductor layer of the SOI technology is nearly ten times higher than that of the polysilicon technology of FIG. 6. There is no trap phenomenon in the grain boundary as seen in polysilicon technology. The LDD structure is not used in this embodiment. The drain current is increased by nearly two orders of magnitude relative to that of FIG. 6. As described above, the horizontal axis indicates gate voltage, the vertical axis indicates drain current in logarithmic plot. When changing the temperature to −40° C., 20° C., and 80° C., a region is identified in which the drain current is temperature-independent near the gate voltage of 1.9 V and near the gate voltage of 12 V.

Figure 22:
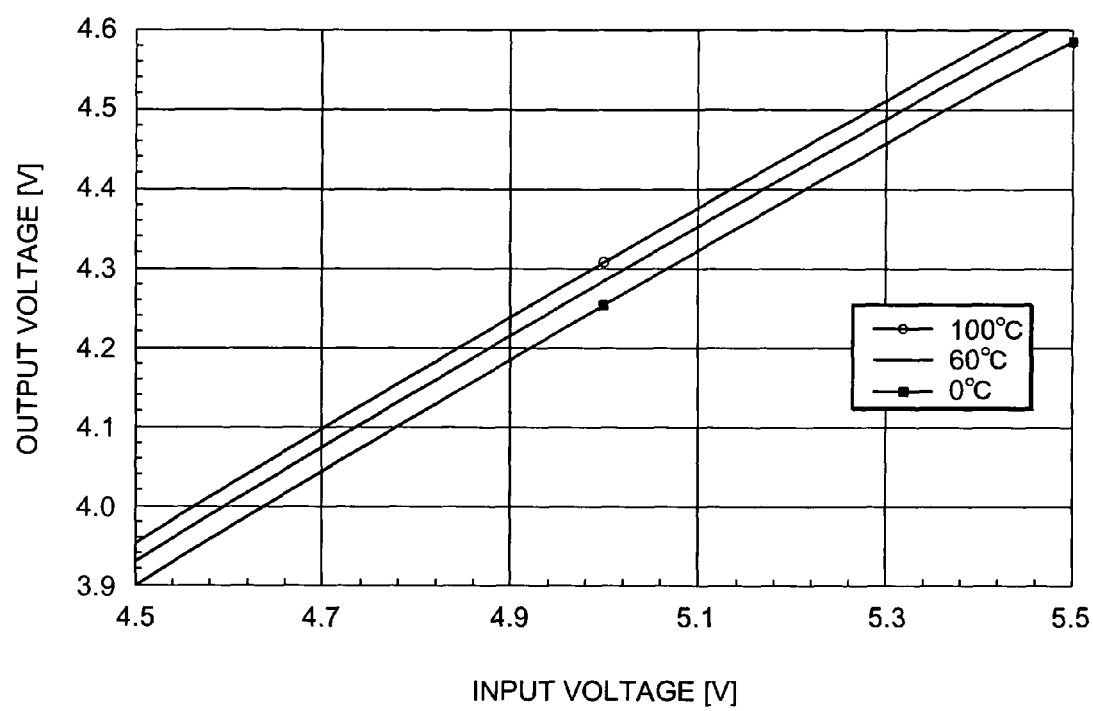
FIG. 22 is a diagram showing temperature dependence of the relation between input voltage and output voltage of the temperature sensor by the partially depleted SOI technology according to Second Embodiment of the present invention.

FIG. 22 shows the input voltage-output voltage characteristic in the thin-film semiconductor device of the structure of FIG. 5A when the control voltage is 12 V. As compared with the polysilicon technology, the temperature sensitivity is rather low. The voltage rise value per kelvin is 0.5 mV. The partially depleted SOI technology can nevertheless realize an acceptable temperature sensor according to the present invention.

Third Embodiment

This embodiment is different from First and Second Embodiments in that the TFT is formed by fully depleted SOI technology, not polysilicon technology. The fully depleted SOI technology is SOI technology wherein the thickness of the silicon film is less than the greatest thickness of the depletion layer. The thickness is generally 50 nm or less. The current-voltage converter adjusts the voltage applied to the gate electrode in the substrate direction (hereinafter, called a back gate voltage) by the fully depleted SOI technology so as to allow in a dummy manner the bottom part of the body region to be undepleted. The electrode applying the back gate voltage is called a back gate electrode. This structure can allow the back gate side of the depleted channel in the fully depleted SOI technology to be undepleted.

Figure 23:
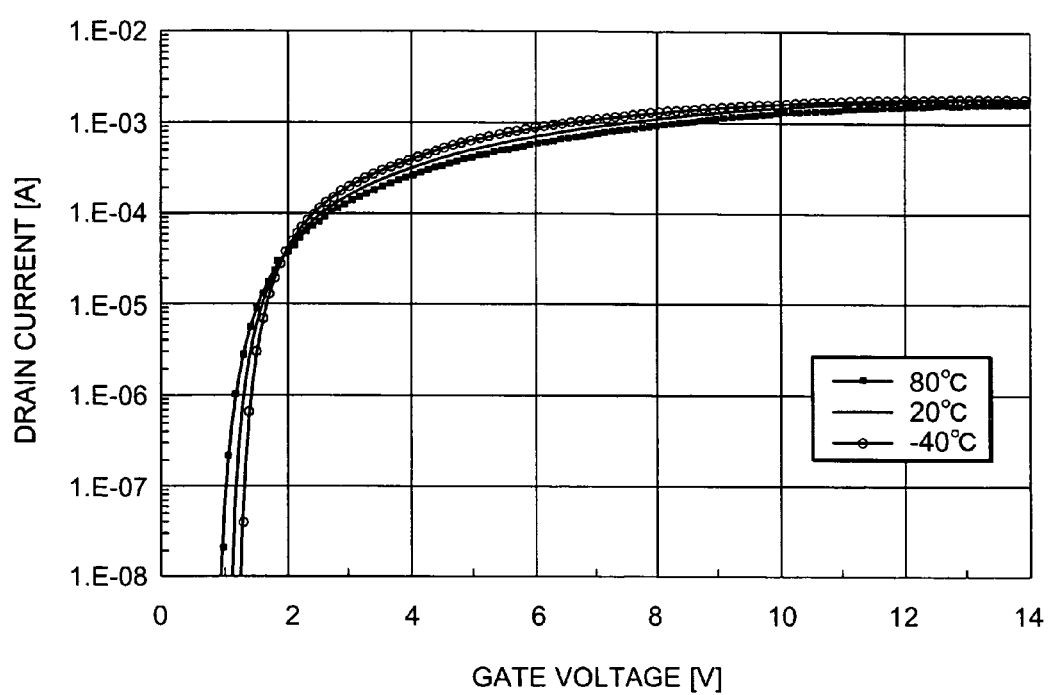
FIG. 23 is a diagram showing temperature dependence of drain voltage in changing gate voltage in a transistor manufactured by the fully depleted SOI technology of the thin-film semiconductor device of the third embodiment of the present invention.
Figure 24:
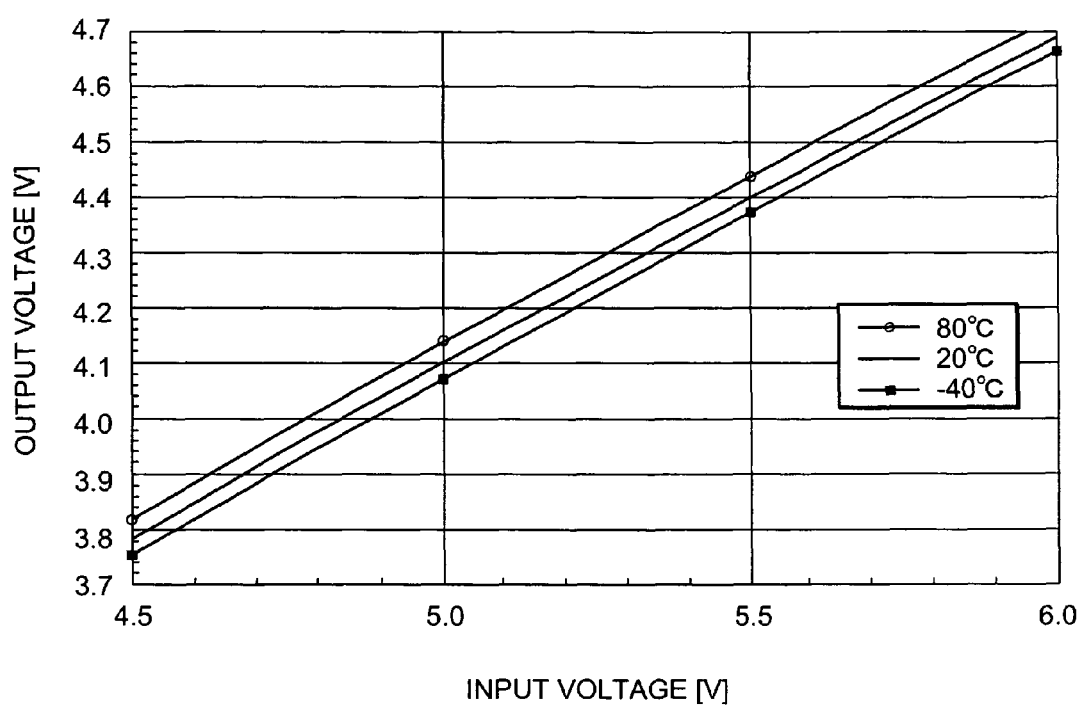
FIG. 24 is a diagram showing temperature dependence of the relation between input voltage and output voltage of the temperature sensor by the fully depleted SOI technology according to Third Embodiment of the present invention.

FIG. 23 shows an example the drain current-gate voltage dependence of the TFT manufactured by the fully depleted SOI technology. A drain current higher than that of the polysilicon technology of FIG. 6 is obtained. As described above, the horizontal axis indicates gate voltage and the vertical axis indicates drain current in a logarithmic plot. When changing the temperature to −40° C., 20° C., and 80° C., a region exists in which the drain current is temperature-independent near the gate voltage of 1.9 V and near the gate voltage of 12 V. Almost the same result as that of the partially depleted SOI technology can be obtained. FIG. 24 shows the input voltage-output voltage characteristic in the thin-film semiconductor device of the structure of FIG. 5A when the control voltage is 12 V. The voltage rise value per kelvin is 0.6 mV. A temperature sensitivity is slightly higher than that of the partially depleted SOI technology. The sensitivity is lower than that of the polysilicon technology; however, the fully depleted SOI technology can nevertheless realize an acceptable thin-film semiconductor device according to the present invention.

As compared with Second and Third Embodiments, the First Embodiment with polysilicon technology using the LDD structure is considered to be most preferred as the temperature sensor for the following reasons: 1. temperature sensitivity higher than that of the SOI technology; and 2. obtaining a temperature-independent characteristic in a lower current region to offer lower power consumption. Whereas circuitry using polysilicon technology conventionally have a problem of variation in the threshold value, the present invention uses a region three or more times the threshold voltage and is relatively insusceptible to the threshold value.

Fourth Embodiment

This embodiment connects the voltage output of the thin-film semiconductor device to an amplifier according to the first embodiment.

Figure 25:
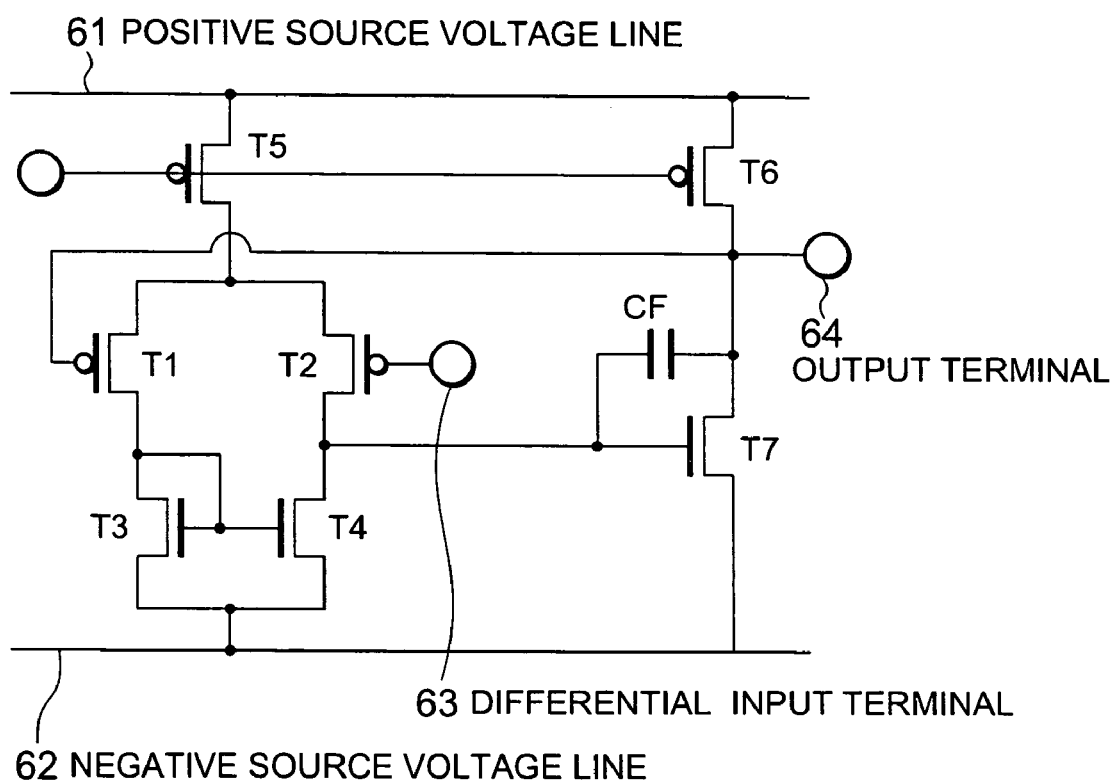
FIG. 25 is a diagram showing the circuitry configuration of an amplifying part according to Fourth Embodiment of the present invention.

FIG. 25 shows the circuitry configuration of a manufactured amplifying component. The amplifying component has an operational transconductance amplifier (OTA) configuration using a current mirror circuit and a differential input circuit. In this embodiment, basic amplifying circuitry using a differential pair will be described. Other amplifying circuitry may be used.

The amplifying component of FIG. 25 uses seven transistors. All the transistors have a gate length of 4 microns. Transistors T1, T2, T5, and T6 are p channel thin-film transistors. Transistors T3, T4, and T7 are n channel thin-film transistors. The gate width of T1 and T2 is 7 microns. The gate width of T3 and T4 is 11 microns. The gate width of T5 is 22 microns. The gate width of T6 and T7 is 75 microns. Compensation capacitance Cf is 35 femto-farads (35 fF). The compensation capacitance is provided by metal of the same layer as the gate electrode line and the data electrode line. The film thickness of an oxide film therebetween is 4000 angstroms. The size of the electrode of the capacitor is 65 microns by 6 microns. When connecting a load of 1 picofarad (1 pF), the amplifying component can obtain a gain of 40 dB (decibels).

A differential input terminal 63 of the amplifying component in FIG. 25 and an output electrode in FIG. 5A, 5B or 5C are connected to construct the thin-film semiconductor device. As for the temperature sensor 1 and the current-voltage converter 2, a gate length is 4 microns, and a gate width is 12 microns. 10 V is applied to a positive source voltage line 61 shown in FIG. 25 and a negative source voltage line 62 is grounded.

Figure 26:
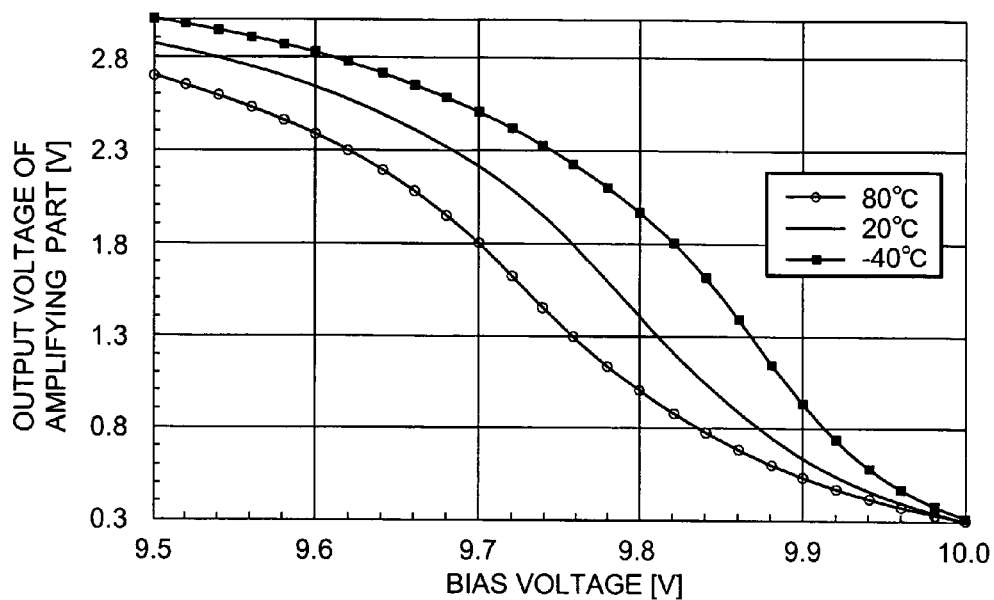
FIG. 26 is a diagram showing temperature dependence of the relation between bias voltage and output voltage of the amplifying part according to Fourth Embodiment of the present invention.

The characteristic of the thin-film semiconductor device is changed depending on the magnitude of a bias voltage applied to the transistors T5 and T6 corresponding to the constant current source. FIG. 26 shows the result obtained by measuring the output voltage of the amplifying component of the thin-film semiconductor device when changing the bias voltage. When changing the temperature to −40° C., 20° C., and 80° C., the temperature dependence of the output voltage is found to be most significant near the bias voltage of 9.8 V.

Figure 27:
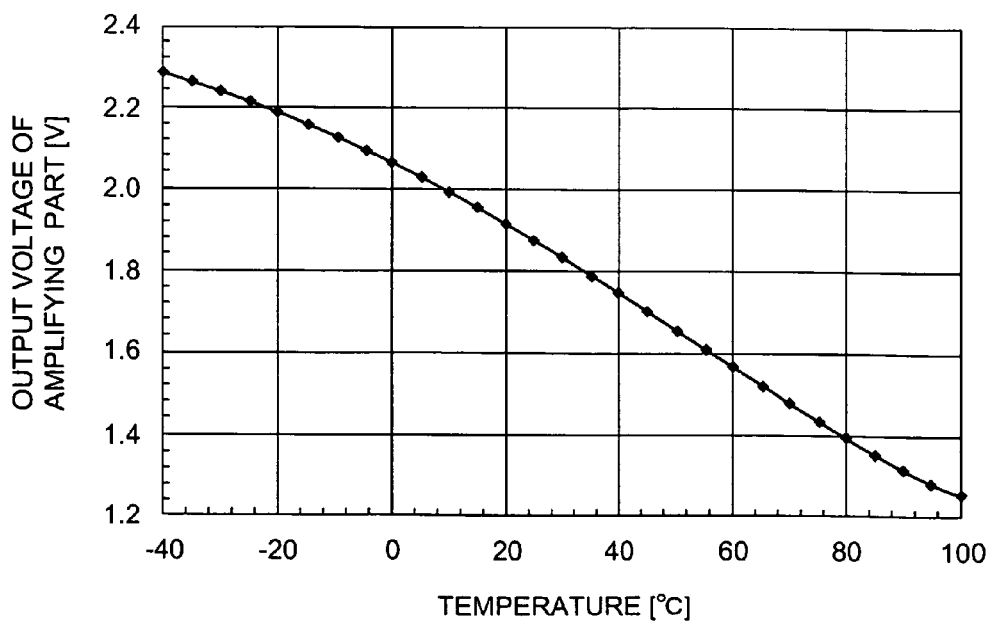
FIG. 27 is a diagram showing the relation between temperature and output voltage of the amplifying part at a bias voltage of the amplifying part of 9.75 V according to Fourth Embodiment of the present invention.

Based on that result, the temperature dependence of the output voltage of an output terminal at the bias voltage of 9.75 V is measured. FIG. 27 shows the result. The temperature is changed from −40° C. to 80° C. by 5° C. increments. A satisfactory linearity to temperature can be obtained. The voltage rise value per kelvin is about 8 millivolts. In this way, an amplitude output about five times larger than that of the first embodiment that lacks the amplifying component can be obtained.

Fifth Embodiment

Figure 28:
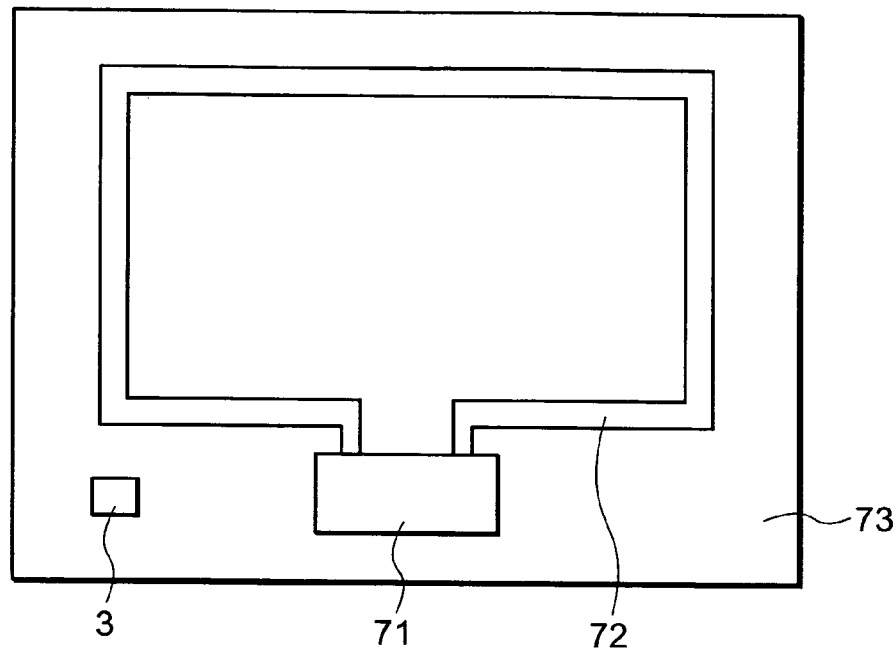
FIG. 28 shows a top view of a exemplary configuration of a RF-ID device.

The fifth embodiment of the present invention is an RF-ID device performing identification using a radio frequency and incorporates a thin-film semiconductor device of the present invention. FIG. 28 shows a top view of an exemplary configuration of a RF-ID device. The RF-ID device includes IC 71 and an antenna 72 disposed on a substrate 73. There are various communication methods and frequency bandwidths of the radio frequency identification (RF-ID) device. By way of example, there are a microwave method using a microwave, an electromagnetic induction method using a band of several tens of kilohertz to several tens of megahertz, and an electromagnetic coupling method using a band of several hundreds of kilohertz. In the present invention, the thin-film semiconductor device 3 is incorporated into the RF-ID device. The temperature-dependent variation in the operation of the device can be compensated in the RF-ID device. The temperature of the RF-ID device or an object provided with the RF-ID device can be monitored externally in a non-contact manner.

Sixth Embodiment

Figure 29:
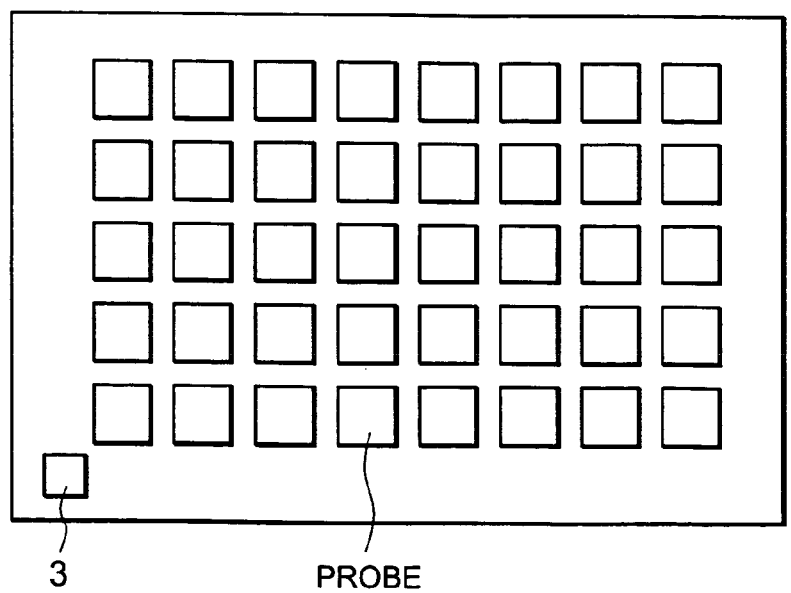
FIG. 29 shows a top of view of an exemplary configuration of a biochip.

The sixth embodiment of the present invention is a biochip or a DNA chip having a thin-film semiconductor device of the present invention. FIG. 29 shows a top view of an exemplary configuration of a biochip. Biochips are broadly classified into an optical type and an electronic type. In the optical type biochip, a DNA fragment (probe) obtained from a known gene is correctly positioned in a predetermined position to be chemically coupled to the substrate. The corresponding portions in an evaluated sample are coupled based on a lock and key relationship and light is emitted by marker means such as luminescent dye for detection by CCD. In the electronic type biochip, a substance to be inspected is marked by an enzyme and is separated into two electrically active portions so that a generated electric current can be detected by a sensor having a gold electrode. The concentration of the target substance is identified from the change of the electric current with time. The polysilicon technology can realize the respective optical and electronic types at low cost and can also realize a biochip merging both. When forming the thin-film semiconductor device 3 of the present invention on the biochip, temperatures when analyzing the manufactured biochip can be precisely monitored to increase the analysis accuracy. With the provision of the thin-film semiconductor device of the present invention, the temperature of a reacted portion can be precisely identified. Data useful for observing a living body can be obtained.

The DNA chip is often considered to be a kind of biochip. However, since the market this type of product is large, it may be classified as its own product type. For most of the DNA chips, it is desirable to use a glass substrate such as slide glass rather then a silicon substrate due to the necessity of fluorescent analysis. Typically, the DNA chip subsequently synthesizes probes on the substrate using the lithography technology, which is very expensive. Using the glass substrate, when performing electric inspection, a special wiring technology is necessary. It is difficult to add a circuit. In application of the polysilicon technology, the glass substrate and the plastic substrate can be used, which can respond to fluorescent analysis. Wiring and circuitry can be inserted between the probe and the glass substrate to make the performance of the DNA chip high. The probe can be manufactured at low cost by applying the ink jet technology (or the bubble jet (trademark) technology) for printing a DNA ink solution or spotting by a micro ceramics pump. This can provide a very high performance DNA chip by the polysilicon technology having electric circuitry at a cost less than $\frac{1}{10}$ of the prior art cost. Application of the thin-film semiconductor device of the present invention to the biochip can precisely monitor temperatures at reaction of DNA analysis for improving the accuracy of the DNA analysis.

Seventh Embodiment

In this embodiment, the thin-film semiconductor device of the present invention is applied to overdrive driving of the liquid crystal display.

Figure 30:
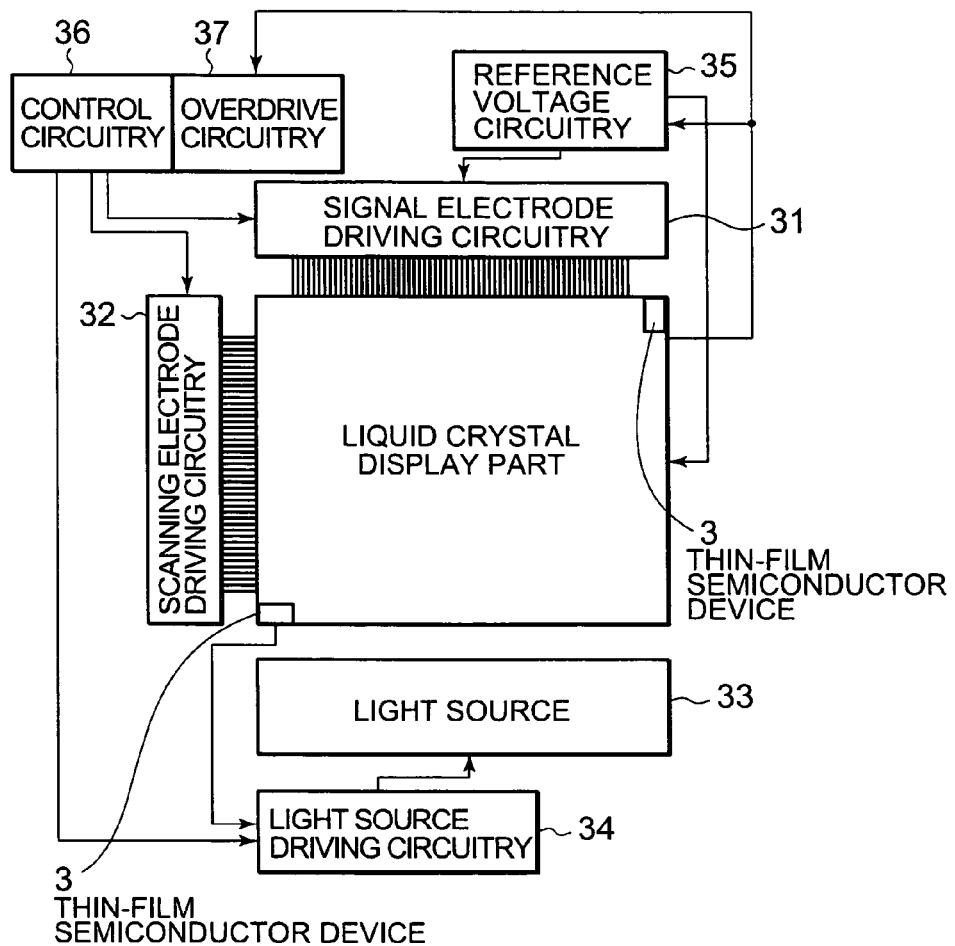
FIG. 30 is a functional structure diagram of the liquid crystal display using an overdrive system.
Figure 31:
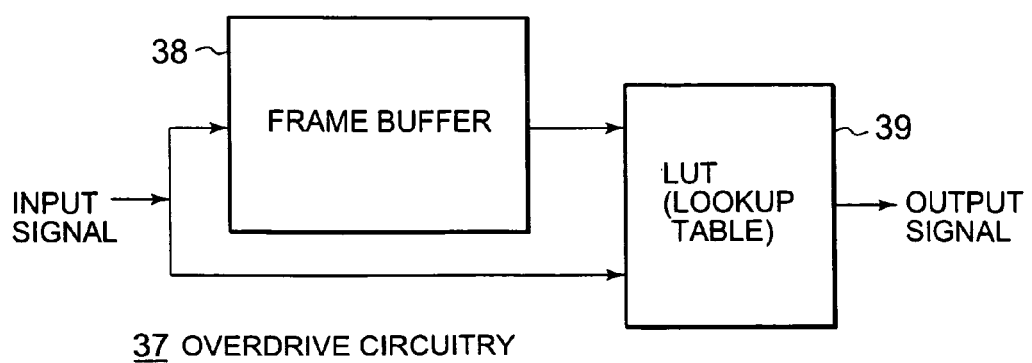
FIG. 31 is a functional block diagram of the liquid crystal display using the overdrive system.

FIG. 30 shows a functional block diagram applying the present invention to the overdrive driving in the liquid crystal display. The basic configuration is the same as FIG. 13 described in the First Embodiment except that overdrive circuitry is connected to the control circuitry. The overdrive applies a voltage higher than that of normal driving to the liquid crystal to increase a field intensity for promoting state change, which is effective for driving the liquid crystal display fast. In this example, feedback to the light source is performed. FIG. 31 shows an example of the functional block in the overdrive circuitry of FIG. 30. In FIG. 31, the overdrive circuitry stores an input signal in a frame buffer 38, reads the signal of the immediately preceding frame from the frame buffer 38, and compares it with the current input signal. Using the compared result, a video signal level after overdrive is read from a lookup table (LUT) 39 to determine a voltage to be actually applied for outputting it as an output signal. In FIG. 30, correction based on temperature information using the thin-film semiconductor device 3 is inputted to both the reference voltage circuitry 35 and overdrive circuitry 37 for performing voltage correction in accordance with temperature. The temperature information from the thin-film semiconductor device 3 is fed back to the light source driving circuitry 34 driving the light source 33 for adjusting the brightness of the light source and light-emitting timing. In this embodiment, as the thin-film semiconductor device 3, the control voltage of the current-voltage converter is 10 V and the input voltage thereof is 5 V.

Figure 32:
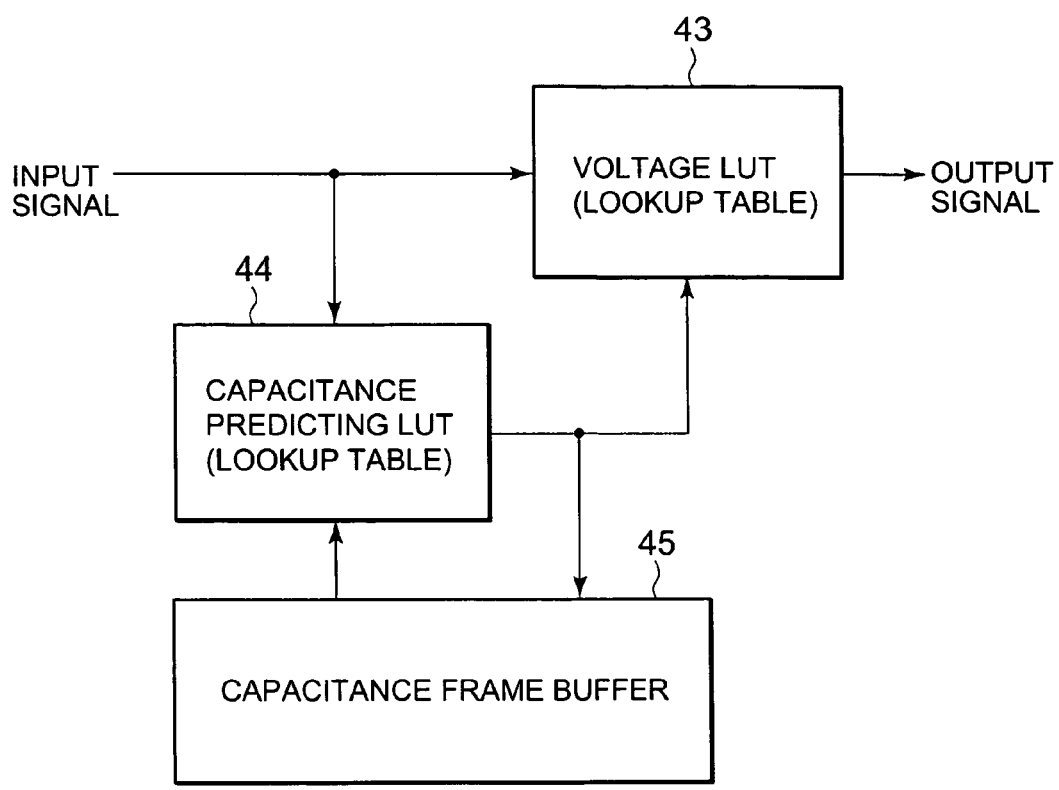
FIG. 32 is a functional block diagram of overdrive circuitry using a capacitance predicting LUT (lookup table)

When performing capacitance prediction in the overdrive method, in place of the overdrive circuitry of FIG. 31, the overdrive circuitry of FIG. 32 is used. The circuitry determines the predicted capacitance of the next frame using a capacitance predicting LUT (lookup table) 44 based on an input signal and the capacitance of each pixel of the immediately preceding frame read from a capacitance frame buffer 45. The predicted capacitance is stored in the capacitance frame buffer 45. A voltage LUT (lookup table) 43 compares it with the input signal and determines a signal to be actually applied for outputting it as an output signal. Using this circuitry, when a desired brightness cannot be obtained since the response of the liquid crystal is slow, the applied voltage can be adjusted so as to reach a necessary liquid crystal capacitance corresponding to a desired brightness within a desired time. Overdrive driving can be thus realized.

The response of the liquid crystal is influenced by temperature. The voltage LUT is prepared for each representative temperature to select the voltage LUT in accordance with a measured temperature. Voltage correction in accordance with temperature in the overdrive circuitry is performed by this structure.

Eighth Embodiment

An example applying the present invention to driving of the liquid crystal display of the field sequential color system (color time division) is shown. In the field sequential color system, the available response time of the liquid crystals is very short. The influence of the lowered response speed of the liquid crystal when the temperature is lowered is significant. In this embodiment, temperatures are monitored by the thin-film semiconductor device to increase the overdrive voltage and the brightness of the backlight at low temperature for obtaining satisfactory image not dependent on temperature.

Figure 33:
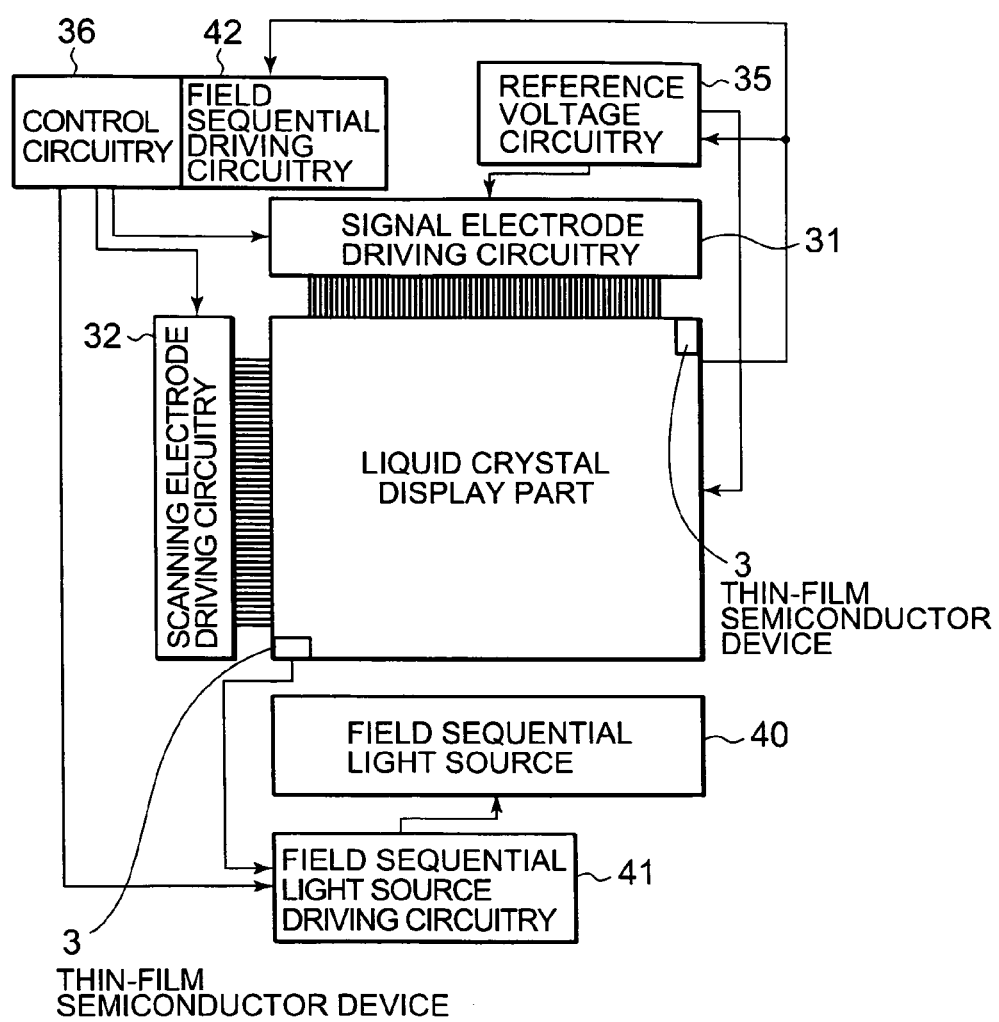
FIG. 33 is a functional structure diagram applying feedback control by the thin-film semiconductor device to the liquid crystal display of the field sequential color.

FIG. 33 shows an example of a functional block when giving feedback based on temperature information in the liquid crystal display of the field sequential system. The basic construction is the same as that of FIG. 13 described in the First Embodiment except that field sequential driving circuitry 42 is connected to the control circuitry 36 to use a field sequential light source 40 as a light source.

In the field sequential color system, a displayed image is divided into some/several color sub images which are then displayed in sequential manner so that the light source of the same color as the sub image is illuminated in synchronization therewith. As the field sequential light source 40, a LED, an EL, or a cold cathode tube having plural wavelength bands can be used. Field sequential light source driving circuitry 41 is driven by the control circuitry 36 and has a function of switching the colors of the field sequential light source 40 at high speed.

Figure 34:
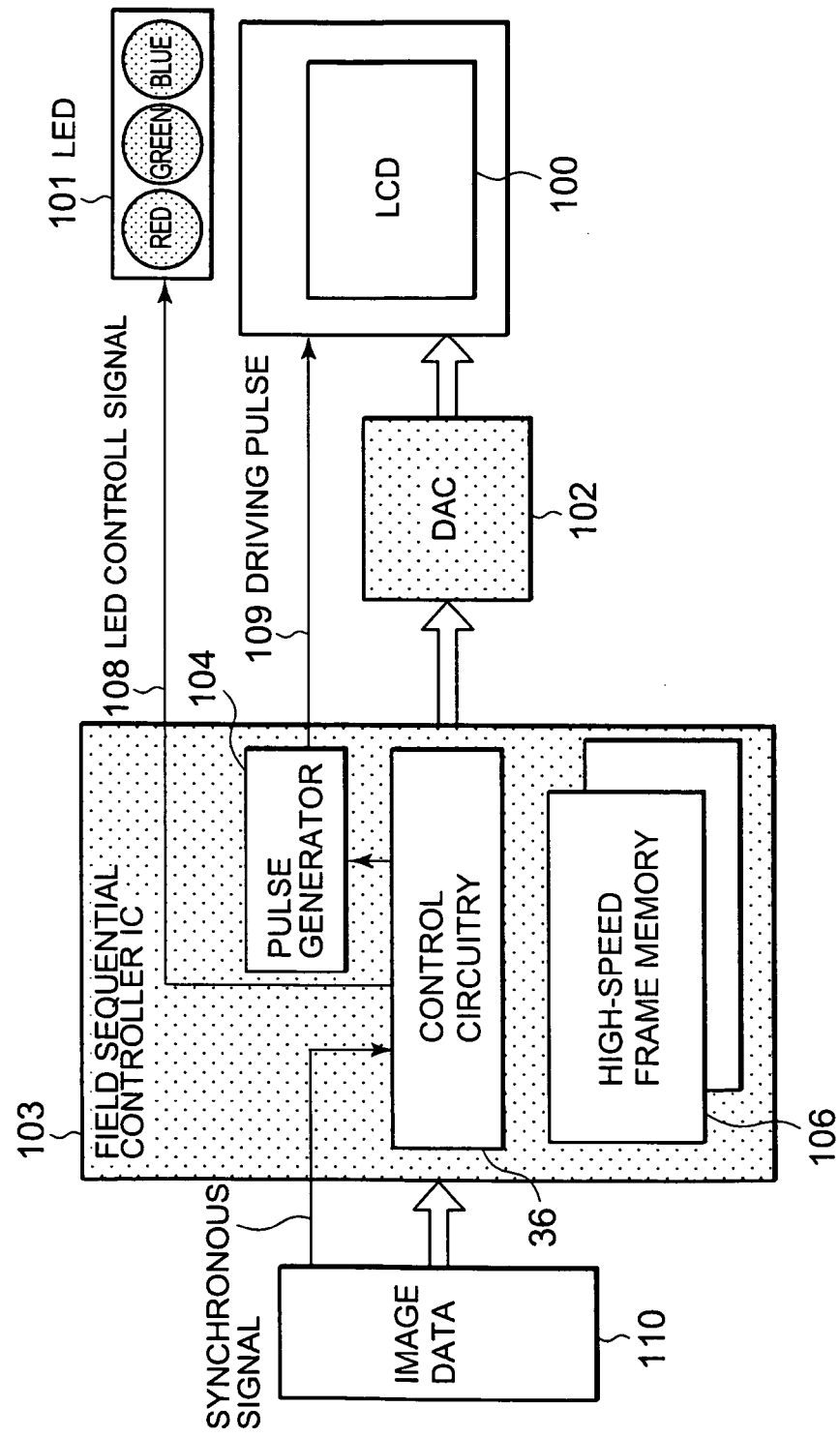
FIG. 34 is a system overall diagram of a liquid crystal display of the field sequential color type.

FIG. 34 shows an example of a field sequential display system in more detail. Image data 110 is processed by a field sequential controller IC 103 to be converted to image data for each of the colors red, blue, and green. The field sequential controller IC 103 has therein the control circuitry 36, a pulse generator 104, and high-speed frame memory 106. The image data 110 is once stored in the fast frame memory to be split into each of the colors. A LED control signal 108 driving a LED 101 is produced from the control circuitry 36 based on information on the colors. At the same time, the control circuitry 36 drives the pulse generator 104 to produce a driving pulse 109. The image data 110 is inputted via a digital analog converter (DAC) 102 to an LCD 100. The LCD 100 receives the driving pulse 109 to illuminate the image of each color. Ordinary image data is processed by the field sequential controller IC 103 incorporating the control circuitry 36, the pulse generator 104, and the high-speed frame memory 106 to be converted to image data for each of the colors of red, blue, and green. The image data is inputted via the DAC 102 to the LCD (liquid crystal display panel) 100. The scanning circuitry in the LCD 100 is controlled by the driving pulse from the pulse generator of the controller IC. Using the LED 101 of three colors as the light source, the LED is controlled by the LED control signal 108 from the controller IC.

FIG. 33 shows the field sequential controller IC 103 of FIG. 34 as two functional blocks of the control circuitry 36 and the field sequential driving circuitry 42. In the field sequential system, the colors of the light source are switched at high speed to realize color display. A color filter is unnecessary for the liquid crystal display part. Color switching, illumination timing, and brightness are processed based on a signal of the control circuitry 36 in the field sequential driving circuitry 41. Like the overdrive system, temperature information of the thin-film semiconductor device 3 is fed back to the reference voltage circuitry 35, the field sequential driving circuitry 42, and the field sequential light source driving circuitry 41. Constant image quality not dependent on temperature can be maintained. In this embodiment, as the thin-film semiconductor device 3, the control voltage of the TFT of the current-voltage converter is 10 V and the input voltage of the TFT of the current-voltage converter is 5 V.

It is found that temperature control can lower brightness change and temperature-dependent color that are seen in the prior art, thereby to improve image quality.

Comparative Example

Figure 35:
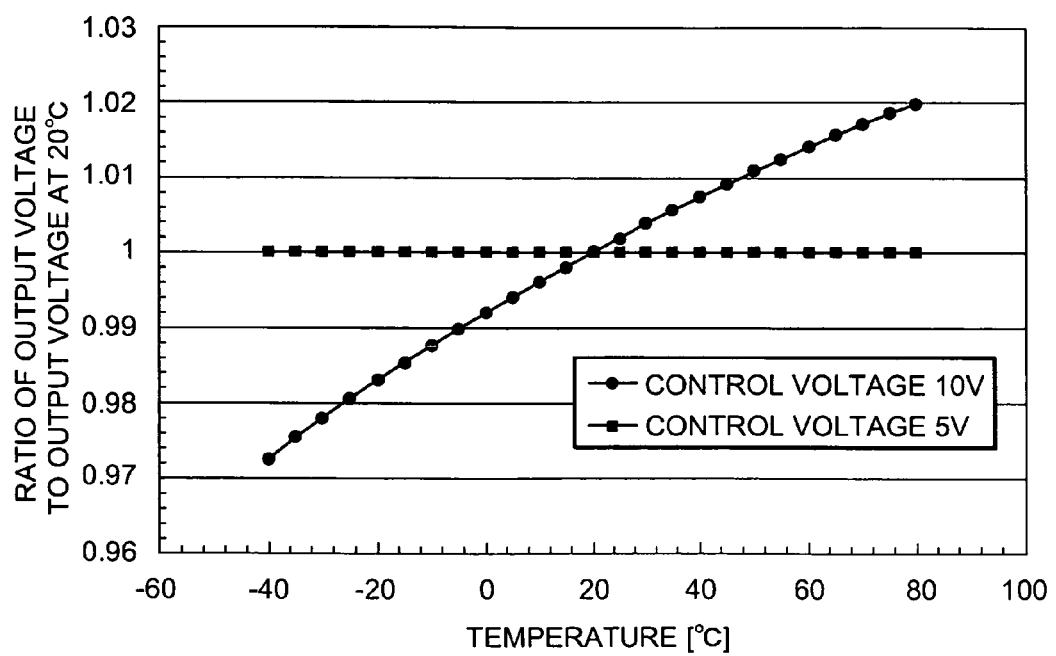
FIG. 35 is a diagram showing the ratio of output voltage at each temperature to output voltage at 20° C. with temperatures indicated on the horizontal axis in First Embodiment and Comparative Example 1.

FIG. 35 shows the temperature dependence of an output voltage when setting the control voltage of the current-voltage converter to 5 V in which the temperature dependence of the current-voltage converter is equal to that of the temperature sensor for the thin-film semiconductor device of the structure of FIG. 5A of First Embodiment. The vertical axis indicates the ratio of measured value at each temperature to measured value at 20° C. The characteristic of the control voltage of 10 V used in the first embodiment is shown for comparison (-•-). As indicated by -■-, in the control voltage of 5 V, the output of the thin-film semiconductor device is almost constant without depending on temperature. No outputs dependent on temperature can be obtained. The function as the temperature sensor cannot be fulfilled.

Although the invention has been described in connection with several preferred embodiments thereof, it will be readily apparent to those skilled in the art that various modifications thereof are possible without departing form the true scope and spirit of the invention as set forth in the appended claims.

What is claimed is:

1. A thin-film semiconductor device comprising:
a temperature sensor formed of a first thin-film semiconductor and sensing a temperature as current; and
a current-voltage converter formed of a second thin-film semiconductor and having temperature dependence in which its current-voltage characteristic is different from that of said temperature sensor;
wherein a temperature sensed by said temperature sensor is converted to a voltage by said current-voltage converter;
wherein said temperature sensor comprises a thin-film semiconductor layer, a gate electrode applying a gate voltage to said thin-film semiconductor layer, and a drain electrode and a source electrode conducting an electric current to said thin-film semiconductor layer, wherein said drain electrode or said source electrode is electrically short-circuited with said gate electrode; and
wherein the drain electrode or the source electrode of a first thin-film transistor of said current-voltage converter is connected to the drain electrode or the source electrode of said temperature sensor.

2. The thin-film semiconductor device according to claim 1, wherein said current-voltage converter comprises said first thin-film transistor comprising a thin-film semiconductor layer, a gate electrode applying a gate voltage to said thin-film semiconductor layer and connected to a source of predetermined control voltage, and a drain electrode and a source electrode conducting an electric current to said thin-film semiconductor layer.

3. The thin-film semiconductor device according to claim 2, wherein at the current-voltage conversion of said first thin-film transistor, said gate voltage is equal to or larger than three times the threshold voltage of said thin-film transistor.

4. The thin-film semiconductor device according to claim 2, wherein at the current-voltage conversion of said first thin-film transistor, said gate voltage is a voltage giving a drain current saturation region of said thin-film transistor.

5. The thin-film semiconductor device according to claim 4, further comprising a controller controlling said gate voltage to a predetermined value when converting an electric current sensed by said temperature sensor to a voltage.

6. The thin-film semiconductor device according to claim 2, wherein said temperature sensor comprises a second thin-film transistor comprising a thin-film semiconductor layer, a gate electrode applying a gate voltage to said thin-film semiconductor layer, and a drain electrode and a source electrode conducting an electric current to said thin-film semiconductor layer.

7. The thin-film semiconductor device according to claim 6, wherein the gate voltage of said temperature sensor and the gate voltage of said current-voltage converter have different values.

8. The thin-film semiconductor device according to claim 1, wherein said temperature sensor is a pn junction diode formed of a third thin-film semiconductor.

9. The thin-film semiconductor device according to claim 6, further comprising a first voltage source applying a first gate voltage to said temperature sensor within a first voltage range wherein a drain current of said temperature sensor has relatively high temperature dependence, and a second voltage source applying a second gate voltage to said current-voltage converter within a second voltage range wherein a drain current of said current-voltage converter has relatively low temperature dependence.

10. The thin-film semiconductor device according to claim 6, further comprising a first voltage source applying a first gate voltage to said temperature sensor within a first voltage range wherein a drain current of said temperature sensor has relatively high temperature dependence, and a second voltage source applying a second gate voltage to said current-voltage converter within a second voltage range wherein a drain current of said current-voltage converter has opposite temperature dependence to that of said temperature sensor.

11. An RF-ID device which performs identification using a radio frequency, the RF-ID device incorporating the thin-film semiconductor device according to claim 1.

12. A biochip or a DNA chip which incorporates the thin-film semiconductor device according to claim 1.

\* \* \* \* \*